United States Patent
Janecek et al.

(10) Patent No.: US 12,424,903 B2
(45) Date of Patent: Sep. 23, 2025

(54) MARINE PROPELLER SYSTEM WITH HIGH TORQUE DRIVE

(71) Applicant: Electric Torque Machines, Inc., Minneapolis, MN (US)

(72) Inventors: Thomas F. Janecek, Flagstaff, AZ (US); Jeremy Scott Reynolds, Flagstaff, AZ (US); Robert J. Lind, Robbinsdale, MN (US); Timothy S. Roman, Minnetonka, MN (US); Tyler K. Williams, Flagstaff, AZ (US)

(73) Assignee: Graco Minnesota Inc., Minneapolis, MN (US)

( * ) Notice: Subject to any disclaimer, the term of this patent is extended or adjusted under 35 U.S.C. 154(b) by 115 days.

(21) Appl. No.: 18/386,818

(22) Filed: Nov. 3, 2023

(65) Prior Publication Data

US 2024/0079929 A1   Mar. 7, 2024

Related U.S. Application Data

(63) Continuation of application No. 18/125,592, filed on Mar. 23, 2023, now Pat. No. 11,831,222, which is a
(Continued)

(51) Int. Cl.
*H02K 7/14*   (2006.01)
*B63H 1/14*   (2006.01)
(Continued)

(52) U.S. Cl.
CPC ............... *H02K 7/14* (2013.01); *B63H 1/14* (2013.01); *B63H 21/17* (2013.01); *B63H 23/34* (2013.01);
(Continued)

(58) Field of Classification Search
CPC ............ H02K 7/14; H02K 7/003; H02K 1/22; H02K 1/16; B63H 1/14; B63H 21/17; B63H 23/34
See application file for complete search history.

(56) References Cited

U.S. PATENT DOCUMENTS 2,243,318 A   5/1941   William
5,306,183 A *  4/1994   Holt ..................... H02K 21/14
                                                          440/6
(Continued)

FOREIGN PATENT DOCUMENTS

DE        29500878 U1    10/1995
DE    102010018145 A1    10/2011
(Continued)

OTHER PUBLICATIONS

International Preliminary Report on Patentability for PCT Application No. PCT/US2021/051248, Dated Mar. 28, 2023, pp. 15.
(Continued)

*Primary Examiner* — Stephen P Avila
(74) *Attorney, Agent, or Firm* — Kinney & Lange, P.A.

(57) ABSTRACT

A fluid moving apparatus includes an electric motor having a rotor and a stator and a propeller. The rotor rotates relative to the stator on an axis to generate a rotational output. The rotational output is provided to the propeller to power the marine propulsion apparatus. The stator includes one or more coils configured to power rotation of the rotor. The one or more coils extend circumferentially around and can be coaxial on the axis. A portion of a housing of the motor extends into the aquatic environment to facilitate heat dissipation.

19 Claims, 14 Drawing Sheets

Related U.S. Application Data continuation of application No. 17/972,966, filed on Oct. 25, 2022, now Pat. No. 11,646,635, which is a continuation of application No. PCT/US2021/051248, filed on Sep. 21, 2021.

(60) Provisional application No. 63/220,376, filed on Jul. 9, 2021, provisional application No. 63/082,995, filed on Sep. 24, 2020.

(51) Int. Cl.
| | | |
|---|---|---|
| *B63H 21/17* | (2006.01) | |
| *B63H 23/34* | (2006.01) | |
| *H02K 1/16* | (2006.01) | |
| *H02K 1/22* | (2006.01) | |
| *H02K 7/00* | (2006.01) | |

(52) U.S. Cl.
CPC ............... *H02K 1/16* (2013.01); *H02K 1/22* (2013.01); *H02K 7/003* (2013.01)

(56) References Cited

U.S. PATENT DOCUMENTS

| | | | |
|---|---|---|---|
| 6,924,579 | B2 | 8/2005 | Calley |
| 7,199,500 | B2 | 4/2007 | Yoshida |
| 7,626,308 | B2 | 12/2009 | Kang et al. |
| 7,876,019 | B2 | 1/2011 | Calley |
| 8,242,658 | B2 | 8/2012 | Calley et al. |
| 8,395,291 | B2 | 3/2013 | Calley et al. |
| 8,405,275 | B2 | 3/2013 | Calley et al. |
| 8,415,848 | B2 | 4/2013 | Calley et al. |
| 8,749,108 | B2 | 6/2014 | Dyer et al. |
| 8,760,023 | B2 | 6/2014 | Calley et al. |
| 8,854,171 | B2 | 10/2014 | Janecek |
| 8,952,590 | B2 | 2/2015 | Calley et al. |
| 8,970,205 | B2 | 3/2015 | Janecek et al. |
| 8,994,243 | B2 | 3/2015 | Calley et al. |
| 9,006,951 | B2 | 4/2015 | Janecek et al. |
| 9,236,773 | B2 | 1/2016 | Janecek et al. |
| 9,360,020 | B2 | 6/2016 | Janecek |
| 9,509,181 | B2 | 11/2016 | Janecek et al. |
| 9,618,003 | B2 | 4/2017 | Janecek et al. |
| 9,749,108 | B2 | 8/2017 | Hoshino et al. |
| 10,106,237 | B2 * | 10/2018 | Kaiser ................ H02K 5/1732 |
| 11,646,635 | B2 | 5/2023 | Janecek et al. |
| 2002/0074891 | A1 | 6/2002 | Gieras et al. |
| 2004/0046478 | A1 | 3/2004 | Zierer et al. |
| 2005/0012427 | A1 | 1/2005 | Seki et al. |
| 2009/0206696 | A1 | 8/2009 | Calley |
| 2011/0221298 | A1 | 9/2011 | Calley et al. |
| 2012/0119599 | A1 | 5/2012 | Calley et al. |
| 2012/0119609 | A1 | 5/2012 | Janecek |
| 2012/0234108 | A1 | 9/2012 | Janecek et al. |
| 2012/0235519 | A1 | 9/2012 | Dyer et al. |
| 2013/0002068 | A1 | 1/2013 | Miyasaka et al. |
| 2013/0015733 | A1 | 1/2013 | Rasch et al. |
| 2015/0048712 | A1 | 2/2015 | Janecek et al. |
| 2015/0147188 | A1 | 5/2015 | Danielsson |
| 2017/0113773 | A1 | 4/2017 | Kaiser et al. |
| 2020/0031445 | A1 | 1/2020 | Wei |
| 2020/0083762 | A1 | 3/2020 | Nitta et al. |
| 2023/0058117 | A1 | 2/2023 | Williams et al. |

FOREIGN PATENT DOCUMENTS

| | | |
|---|---|---|
| DE | 102011084296 A1 | 4/2013 |
| DE | 112014006362 T5 | 11/2016 |
| EP | 1063754 A2 | 12/2000 |
| EP | 1587207 A1 | 10/2005 |
| EP | 2006977 A2 | 12/2008 |
| EP | 2159903 A2 | 3/2010 |
| EP | 2594477 A1 | 5/2013 |
| EP | 2686939 A2 | 1/2014 |
| EP | 3082231 A1 | 10/2016 |
| GB | 2491880 A | 12/2012 |
| JP | 2009005420 A | 1/2009 |
| WO | 2010064368 A1 | 6/2010 |
| WO | 2012125790 A2 | 9/2012 |
| WO | 2015089518 A1 | 6/2015 |
| WO | 2015163871 A1 | 10/2015 |
| WO | 2021163156 A1 | 8/2021 |
| WO | 2022035940 A1 | 2/2022 |
| WO | 2022066616 A2 | 3/2022 |
| WO | 2022165015 A1 | 8/2022 |
| WO | 2023043904 A1 | 3/2023 |
| WO | 2023055690 A2 | 4/2023 |
| WO | 2023114290 A1 | 6/2023 |

OTHER PUBLICATIONS

International Search Report and Written Opinion for PCT Application No. PCT/US2021/051248, Dated Mar. 1, 2022, pp. 20.

Invitation to Pay Additional Fees for PCT Application PCT/US2021/051248, Dated Dec. 20, 2021, pp. 18.

* cited by examiner

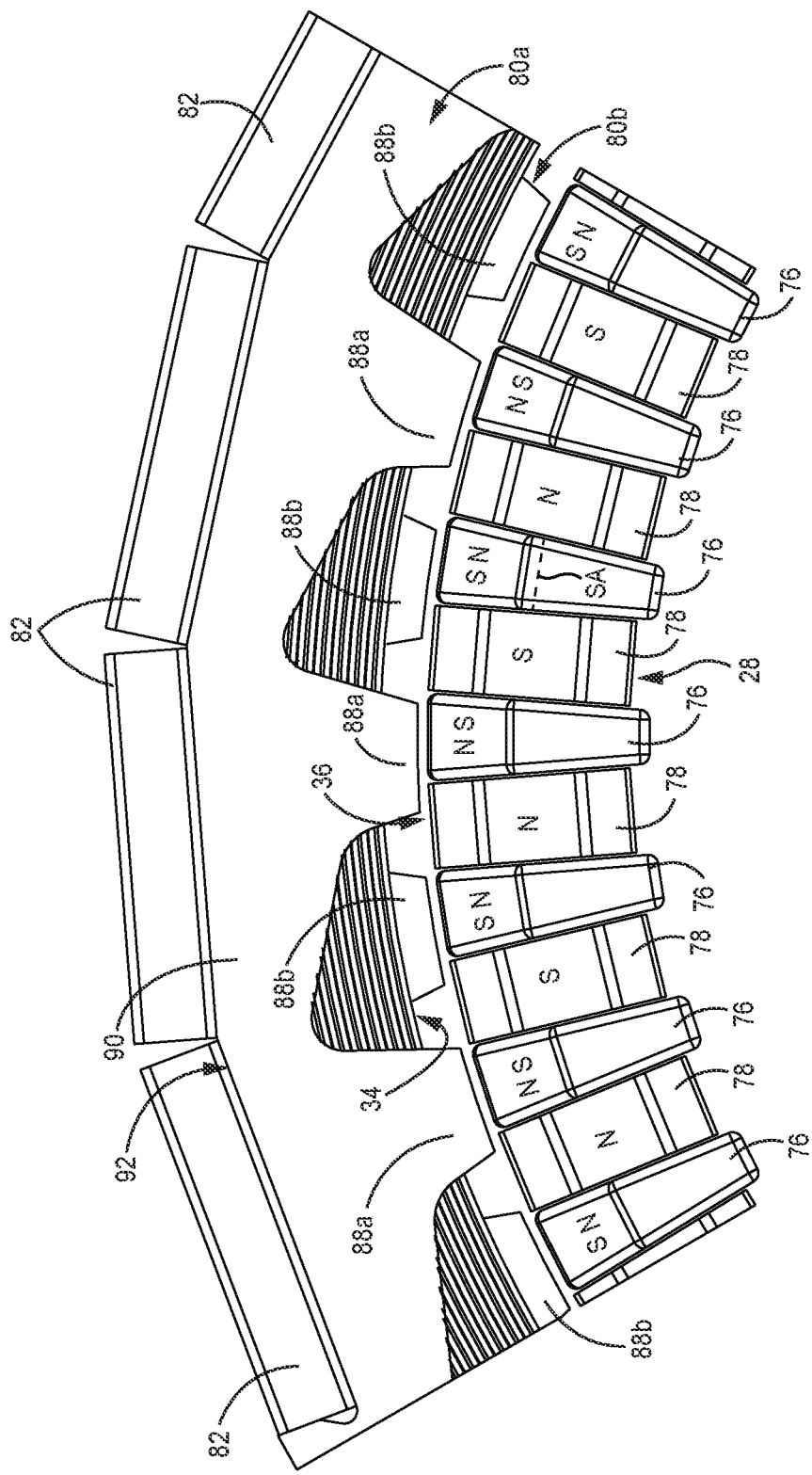

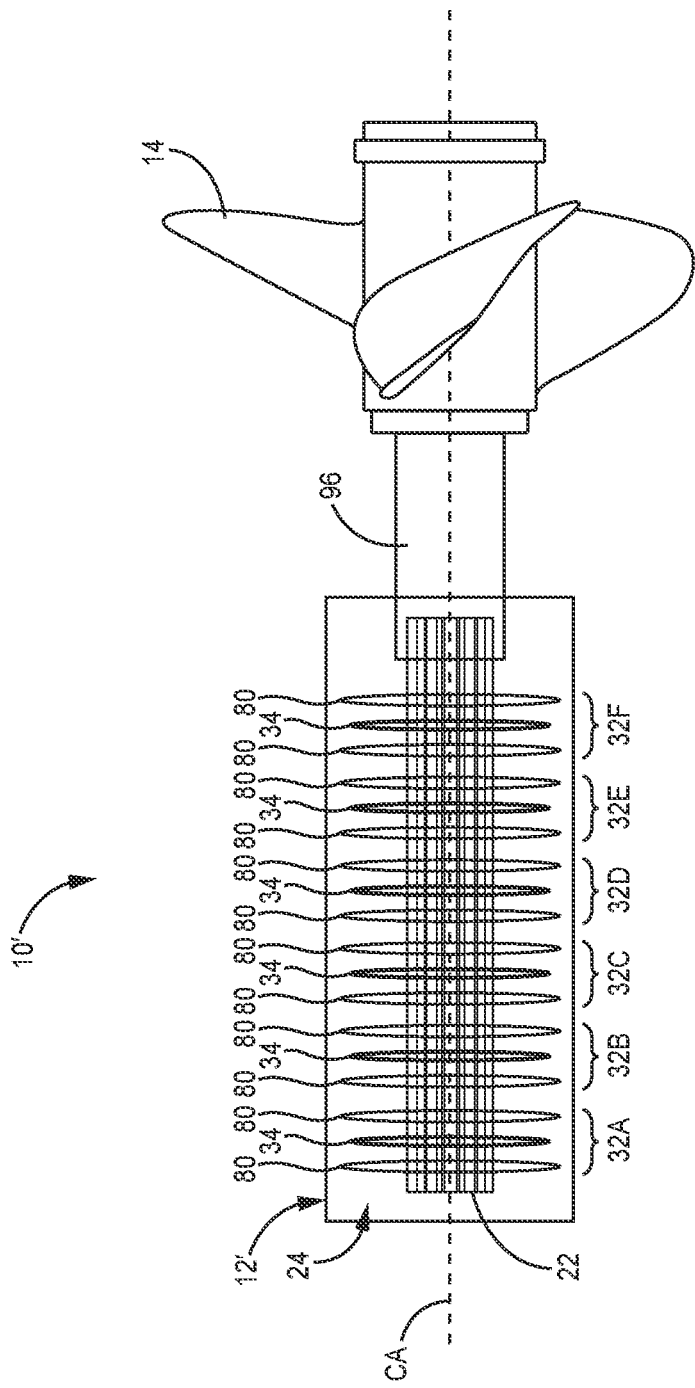

MARINE PROPELLER SYSTEM WITH HIGH TORQUE DRIVE

CROSS-REFERENCE TO RELATED APPLICATION(S)

This application is a continuation of U.S. application Ser. No. 18/125,592 filed Mar. 23, 2023 for "MARINE PROPELLER SYSTEM WITH HIGH TORQUE DRIVE," which in turn is a continuation of U.S. application. Ser. No. 17/972,966 filed Oct. 25, 2022 and entitled "MARINE PROPELLER SYSTEM WITH HIGH TORQUE DRIVE," now patented 11,646,635, which in turn is a continuation of PCT International Application No. PCT/US21/51248 filed Jul. 9, 2021 for "MARINE PROPELLER SYSTEM WITH HIGH TORQUE DRIVE," which in turn claims the benefit of U.S. Provisional Application No. 63/082,995 filed Sep. 24, 2020, for "MARINE PROPELLER SYSTEM WITH HIGH TORQUE DRIVE," and claims the benefit of U.S. Provisional Application No. 63/220,376 filed Jul. 9, 2021, for "MARINE PROPELLER SYSTEM WITH HIGH TORQUE DRIVE," the disclosures of which are hereby incorporated by reference in their entireties.

BACKGROUND

This disclosure relates to pump systems. More specifically, this disclosure relates to drives for moving fluids for use in various applications, such as pump apparatuses and marine pumps for watercraft propulsion. The features of each pump system referenced herein can be usable in a marine drive.

SUMMARY

According to one aspect of the disclosure, a marine propulsion apparatus includes an electric motor configured to generate a rotational output and a propeller configured to be rotated by the electric motor. The electric motor includes a motor housing; a rotor configured to rotate about a common axis; and a stator disposed within the motor housing and configured to be electrically energized to generate magnetic flux that causes the rotor to rotate, the stator comprising one or more coils, each coil of the one or more coils coaxial with the common axis.

According to an additional or alternative aspect of the disclosure, a marine propulsion apparatus includes an electric motor configured to generate a rotational output and a propeller configured to be rotated by the motor. The electric motor includes a rotor configured to rotate about a common axis; and a stator configured to be electrically energized to generate magnetic flux that causes the rotor to rotate, the stator comprising one or more coils, each coil of the one or more coils coaxial with the common axis.

According to another additional or alternative aspect of the disclosure, a marine propulsion apparatus includes an electric motor configured to generate a rotational output and a propeller configured to be rotated by the motor. The electric motor includes a rotor configured to rotate about a common axis; and a stator configured to be electrically energized to generate magnetic flux that causes the rotor to rotate, the rotator rotating around the stator; and According to yet another additional or alternative aspect of the disclosure, a marine propulsion apparatus includes an electric motor configured to generate a rotational output and a propeller configured to be rotated by the motor. The electric motor includes a rotor configured to rotate about a common axis; and a stator configured to be electrically energized to generate magnetic flux that causes the rotor to rotate. The stator comprises at least six phase assemblies that are configured as a plurality of synchronized arrays, wherein each synchronized array of the plurality of arrays includes at least two of the phase assemblies configured to be powered in-phase.

According to yet another additional or alternative aspect of the disclosure, a marine propulsion apparatus includes an electric motor configured to generate a rotational output and a propeller configured to be rotated by the motor. The electric motor includes a motor housing having a first end and a second end; a rotor configured to rotate about an axis; a stator disposed within the motor housing and configured to be electrically energized to generate magnetic flux that causes the rotor to rotate on the axis; and a circuit board assembly is mounted to the first end of the motor housing, the circuit board assembly configured to regulate power to the stator to electrically energize the stator. The propeller is spaced from the second end of the motor.

According to yet another additional or alternative aspect of the disclosure, a marine propulsion apparatus is configured to extend from a body of a watercraft and be disposed at least partially within an aquatic environment to provide propulsive force to the watercraft. The marine propulsion apparatus includes a support extending from the watercraft; an electric motor configured to generate a rotational output, and a propeller configured to be rotated by the motor. The motor includes a motor housing connected to the support, the motor housing including an outer portion projecting outside of the support such that the outer portion is configured to be disposed within the aquatic environment; a rotor configured to rotate about a common axis; and a stator disposed within the motor housing, wherein a stator body of the stator is fixed to the motor housing.

BRIEF DESCRIPTION OF THE DRAWINGS

FIG. 6C is an enlarged end view showing magnetic polarity of components of the rotor portion of the motor.

FIG. 9 is a schematic diagram of a marine propulsion system.

DETAILED DESCRIPTION

This disclosure is directed to a pump apparatus having an electric motor that rotates about an axis and drives a propeller to move fluid to propel a watercraft. The electric motor and the propeller can be coaxial on a common axis. The electric motor includes a rotor that rotates about the common axis and a stator that is electrically energized to generate magnetic flux that causes the rotor to rotate. The stator includes one or more coils that are each coaxial with the common axis.

Figure 1:
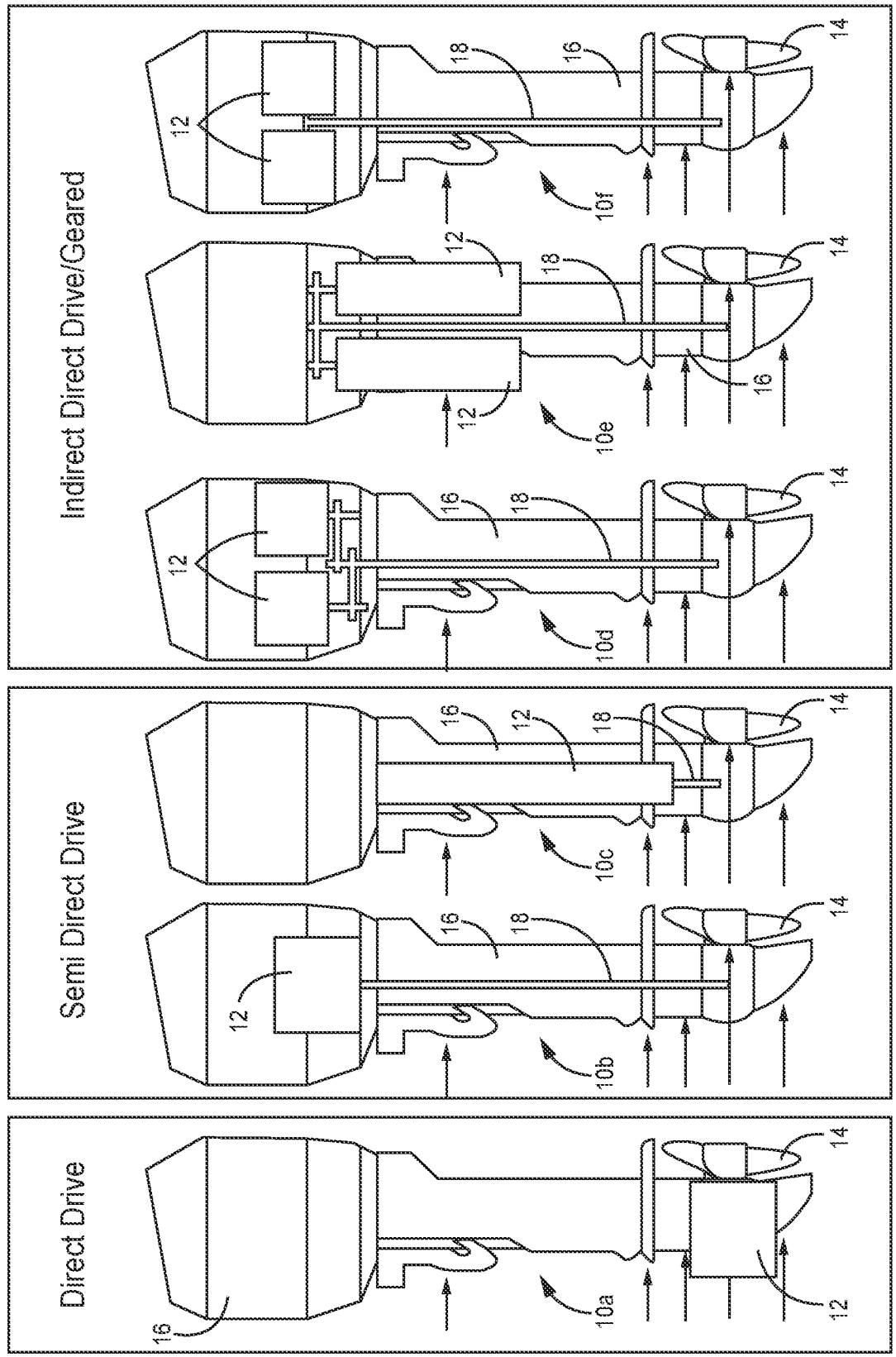
FIG. 1A is a schematic diagram of a marine propulsion system.
FIG. 1B is a schematic diagram of a marine propulsion system.
FIG. 1C is a schematic diagram of a marine propulsion system.
FIG. 1D is a schematic diagram of a marine propulsion system.
FIG. 1E is a schematic diagram of a marine propulsion system.
FIG. 1F is a schematic diagram of a marine propulsion system.

FIG. 1A is a schematic diagram of a marine propulsion system 10*a*. FIG. 1B is a schematic diagram of a marine propulsion system 10*b*. FIG. 1C is a schematic diagram of a marine propulsion system 10*c*. FIG. 1D is a schematic diagram of a marine propulsion system 10*d*. FIG. 1E is a schematic diagram of a marine propulsion system 10*e*. FIG. 1F is a schematic diagram of a marine propulsion system 10*f*.

Each of marine propulsion systems 10*a*-10*f* includes a motor 12 and a propeller 14. The motor 12 is connected to a support 16 that can extend relative to the hull of a marine vessel. The supports 16 as shown are configured for use as outboard systems, but it is understood that other configurations are possible. Motor 12 is an electric motor 12 configured to generate a rotational output. In some examples, the motor 12 can be placed fully or partially below the waterline. In some examples, motor 12 can be disposed coaxially with the propeller 14 as shown in marine portion system 10*a*. In this embodiment, no drive 18 is needed. The marine propulsion system 10*a* can be considered to be a direct drive system.

Marine propulsion systems 10*b*-10*f* each include a drive 18. The drive 18 is configured to receive a rotational output from the motor 12 and to provide the rotational output to the propeller 14 to cause the propeller 14 to rotate about a propeller axis. Drive 18 thereby transfers rotational motion from the motor 12 to the propeller 14. Such motion may be transferred by rotating shafts, belts, and/or chains, among other options. In some examples, bevel gearing is used to change the rotational direction between the output of motor 12 and the input to propeller 14. Marine propulsion system 10*d* shows two motors 12, as do marine propulsion systems 10*e* and 10*f*. The motor 12 in marine propulsion system 10*c* is elongated to have multiple phase assemblies 32 (e.g., two) for each of the three phases of the motor 12, as discussed in more detail below.

Figure 2:
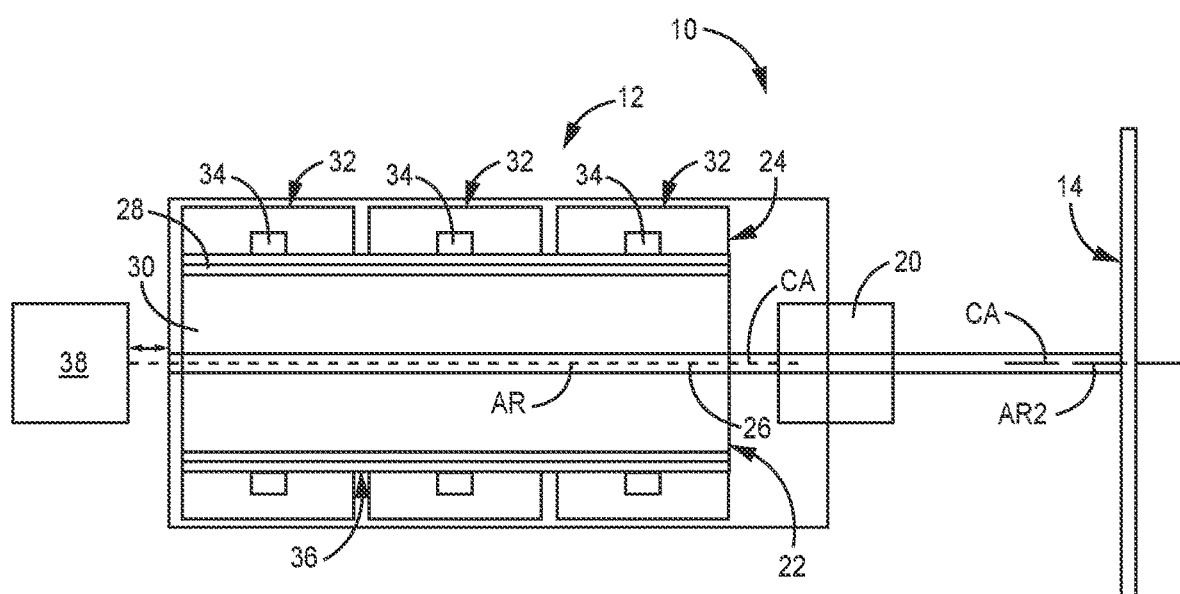
FIG. 2 is a schematic block diagram of a marine propulsion system.

FIG. 2 is a schematic block diagram of marine propulsion system 10. Marine propulsion system 10 includes motor 12, propeller 14, and seal assembly 20. Rotor 22, stator 24, and drive shaft 26 of motor 12 are shown. Rotor 22 includes permanent magnet array 28 and rotor body 30. Stator 24 includes phase assemblies 32 that each include a coil 34.

Motor 12 is an electric motor. Rotor 22 is configured to rotate relative to stator 24 and on axis of rotation AR. Propeller 14 is operably connected to rotor 22 to be rotated by rotor 22. Propeller 14 is configured to move a watercraft by pushing off of water that propeller 14 is at least partially submerged in. Motor 12 can be disposed coaxially with propeller 14 such that each of rotor 22 and propeller 14 rotate about a common axis. In such an example, the electric and/or magnetic components of motor 12 (e.g., rotor 22 and stator 24) can be submerged, partially or wholly, beneath the water surface.

Stator 24 is disposed coaxially with rotor 22 on the axis of rotation AR. The axis of rotation AR is coaxial with common axis CA on which propeller 14 also rotates. Rotor 22 includes permanent magnet array 28 oriented towards stator 24. In the example shown, rotor 22 is disposed within stator 24 and permanent magnet array 28 is disposed on a radially outer side of rotor body 30. Air gap 36 is formed between stator 24 and rotor 22 such that stator 24 and rotor 22 are not in direct contact. More specifically, the air gap 36 is formed radially between stator 24 and permanent magnet array 28. As such, motor 12 can be considered to include an inner rotor. It is understood, however, that in various other examples the rotor 22 is disposed about stator 24 to rotate about stator 24 such that motor 12 can be considered to include an outer rotor. In such examples, permanent magnet array 28 can be disposed on an inner radial surface of rotor body 30.

Stator 24 includes phase assemblies 32 that are arrayed along and around the axis of rotation AR. Each phase assembly 32 includes a coil 34 extending circumferentially about the common axis CA. The phase assemblies 32 include metallic components formed on each axial side of the coil 34 of that phase assembly 32. The metallic components can be formed wholly or partially from stacks of laminations. Laminations can be formed from material which is readily susceptible to polarization from the fields generated by coils 34. Such material is typically ferromagnetic. The ferromagnetic materials can be metal such as iron or an alloy of iron, such as steel. More specially, laminations can be formed from silicon steel, among other options. Ferromagnetic material can be a ceramic doped or otherwise embedded with ferromagnetic elements.

The coils 34 are formed as hoops of metal that extend circumferentially about the common axis CA. The coils 34 are thus coaxial with the common axis CA. Each of the coils 34 is discrete with respect to the other ones of the coils 34. Each coil 34 is a winding of wire, ribbon, etc., typically copper, around the common axis CA. Thus, each coil 34 could be a continuous winding of 20, 30, 40, 50, 100, or less or more loops around the common axis CA. Each coil 34 has two termination wires representing the ends of the circuit of each coil 34 for running an AC signal through the coil 34, which can electrically connect with the controller 38.

The coils 34 do not radially overlap or crossover each other. No part of any one of the coils 34 is disposed at the same axial location along the common axis CA as any other one of the coils 34. As such, none of the coils 34 circumferentially overlaps with any of the other coils 34. There is an axial gap between each of the coils 34 of the motor 12. The coils 34 are thus located at separate and distinct axial positions along the common axis CA. Each coil 34 is made from circular loops of wire. The common axis CA extends through each loop of each coil 34. The coils 34 do not include loops wherein the common axis CA does not extend through such loop. The wire of the loops does not extend axially but instead extends circumferentially about the common axis CA.

The terms radial or radially as used herein means orthogonal to the common axis CA, unless otherwise noted. The terms axial or axially as used herein means parallel with the common axis CA, unless otherwise noted. The terms circumferential or circumferentially as used herein means around the common axis CA, unless otherwise noted.

Controller 38 is operably connected to motor 12, electrically and/or communicatively, to control operation of motor 12. Controller 38 thereby controls propulsion by marine propulsion system 10. Controller 38 can be of any desired configuration for controlling propulsion and can include control circuitry and memory. Controller 38 is configured to store executable code, implement functionality, and/or process instructions. Controller 38 is configured to perform any of the functions discussed herein, including receiving an output from any sensor referenced herein, detecting any condition or event referenced herein, and controlling operation of any components referenced herein. Controller 38 can be of any suitable configuration for controlling operation of marine propulsion system 10, gathering data, processing data, etc. Controller 38 can include hardware, firmware, and/or stored software. Controller 38 can be of any type suitable for operating in accordance with the techniques described herein. It is understood that controller 38 can be entirely or partially disposed across one or more circuit boards. As shown in more detail below, controller 38 can include multiple circuit boards mounted to the housing of motor 12. In some examples, controller 38 can be implemented as a plurality of discrete circuitry subassemblies.

During operation, power is provided to coils 34 and phase assemblies 32 generate electromagnetic fields that interact with the permanent magnet array 46 to drive rotation of rotor 22. The embodiment of the motor 12 shown includes three phases corresponding to the three phase assemblies 32 and the coils 34 therein in which three sinusoidal AC signals are delivered through the coils 34, 120-degrees electrically offset. If there were two phase assemblies 32 and two coils 34, then the two sinusoidal AC signals would be 180 degrees apart, or 90 degrees apart for sets of four phase assemblies 32, etc. As discussed in more detail below, some examples include multiple phase assemblies 32 where the sinusoidal AC signals are not offset. For example, motor 12 can include six phase assemblies and three sinusoidal AC signals can be delivered 120-degrees electrically offset. The three sinusoidal AC signals can be provided to groupings (e.g., pairs) of the phase assemblies 32 such that multiple phases are provided with in-phase signals.

Rotor 22 rotates on common axis CA and generates the rotational output. Rotor 22 rotates to cause rotation of drive shaft 26. Drive shaft 26 is supported by rotor body 30 to rotate with rotor body 30. Drive shaft 26 extends out of the housing of motor 12 through seal assembly 20. Seal assembly 20 separates the wet exterior environment around motor 12 from the dry interior of motor 12 where electric components of motor 12 are disposed. Seal assembly 20 allows the rotating drive shaft 26 to extend out of the motor housing while forming a seal between the rotating shaft 26 and the stationary motor housing. Seal assembly 20 can also be referred to as a stuffing box.

The rotational output is provided to propeller 14 to drive rotation of propeller 14. Rotation of the propeller 14 displaces liquid (e.g., water) to propel an apparatus connected to marine propulsion system 10 (e.g., a boat or other watercraft). In some examples, motor 12 is a reversible motor such that rotor 22 can be driven in a first rotational direction (e.g., one of clockwise and counterclockwise) to cause propeller 14 to rotate in a first rotational direction and rotor 22 is driven in a second rotational direction (e.g., the other of clockwise and counterclockwise) to cause propeller 14 to rotate in a second, opposite rotational direction. It is understood that rotor 22 and propeller 14 can be connected such that rotor 22 and propeller 14 rotate in the same rotational direction or such that rotor 22 and propeller 14 rotate in opposite rotational directions. The axis of rotation AR of the rotor 22 can be coaxial with the axis of rotation AR2 of the propeller 14 (e.g., on the common axis CA). There may be no mechanical amplification between the rotor 22 and the rotating propeller 14. For example, there may be no gearing between the rotor 22 and the rotating propeller 14, or possibly no gearing on the entire marine propulsion system 10. The rotor 22 and the rotating propeller 14 may be fixed such that one revolution of the rotor 22 results in one revolution of the propeller 14. Traditional AC induction motors use a plurality of discrete coils that extend axially and form an array of coils extending circumferentially around the axis of rotation of the rotor. Each coil represents a potential pole for acting on a magnet. The discrete coils arrayed circumferentially around the axis of rotation in a conventional AC induction motor are out of phase with respect to each other. The potential torque generated is proportional to the number of poles. The number of poles in such a motor is limited by the ability to fit discrete coils circumferentially around the axis of rotation within the motor.

Coils 34 that extend all the way circumferentially around the common axis CA allow for many more poles than traditional AC induction motors, and more poles allows the generation of forces to be spread more evenly about the circumference of the rotor 22, to minimize off-center forces or eliminate unproductive parts of forces. Co-locating the axis of rotation AR of rotor 22 with the axis of rotation of the propeller 14 on a common axis CA further minimizes off-center forces. The high pole count eliminates or reduces the need for reduction gearing, further reducing off-center forces as well as reducing weight and friction, allowing for a more compact arrangement of marine propulsion system 10. The present motor 12 design facilitates high torque generating high responsiveness and speed control with minimal or no gearing reduction, again reducing cost, weight, friction, and package size. Having the axis of rotations of the rotor 22 and propeller 14 coaxial with respect to each other (e.g., along the common axis CA) allows for a compact and efficient marine propulsion design.

In some examples, there is no mechanical amplification (mechanically decrease speed to increase torque) between the rotational output of the motor 12 and the rotational output of propeller 14. While the motor 12 can develop high torque at low speeds, unlike a traditional AC induction motor, the present motor 12 can also develop high torque at high speeds.

Figure 3A:
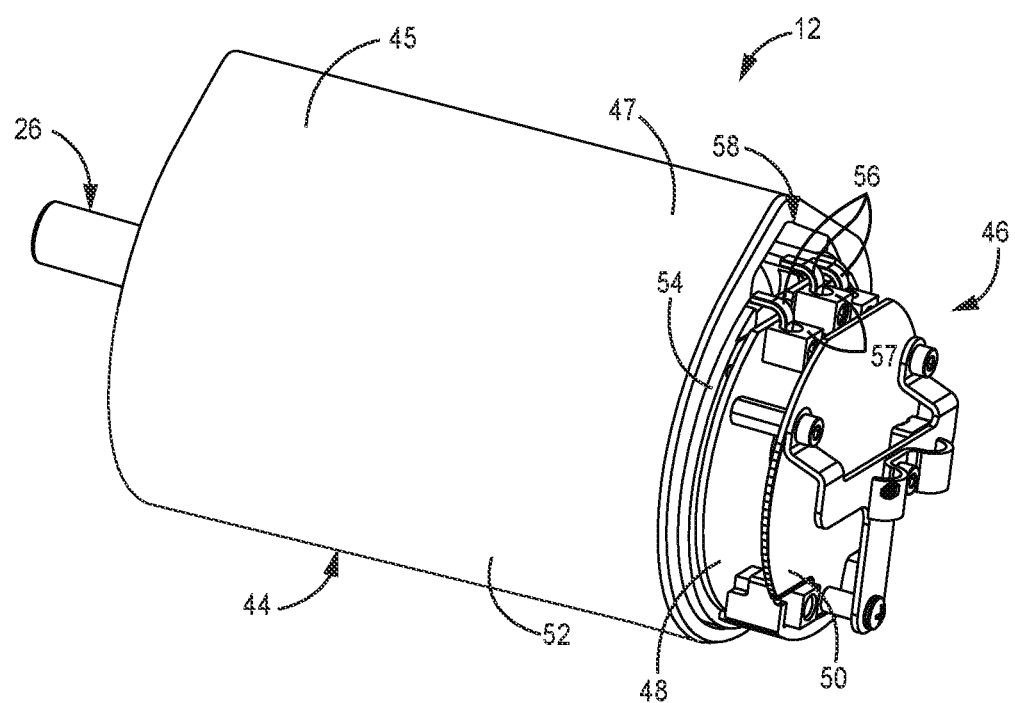
FIG. 3A is an isometric view of a motor of a marine propulsion system.
Figure 3B:
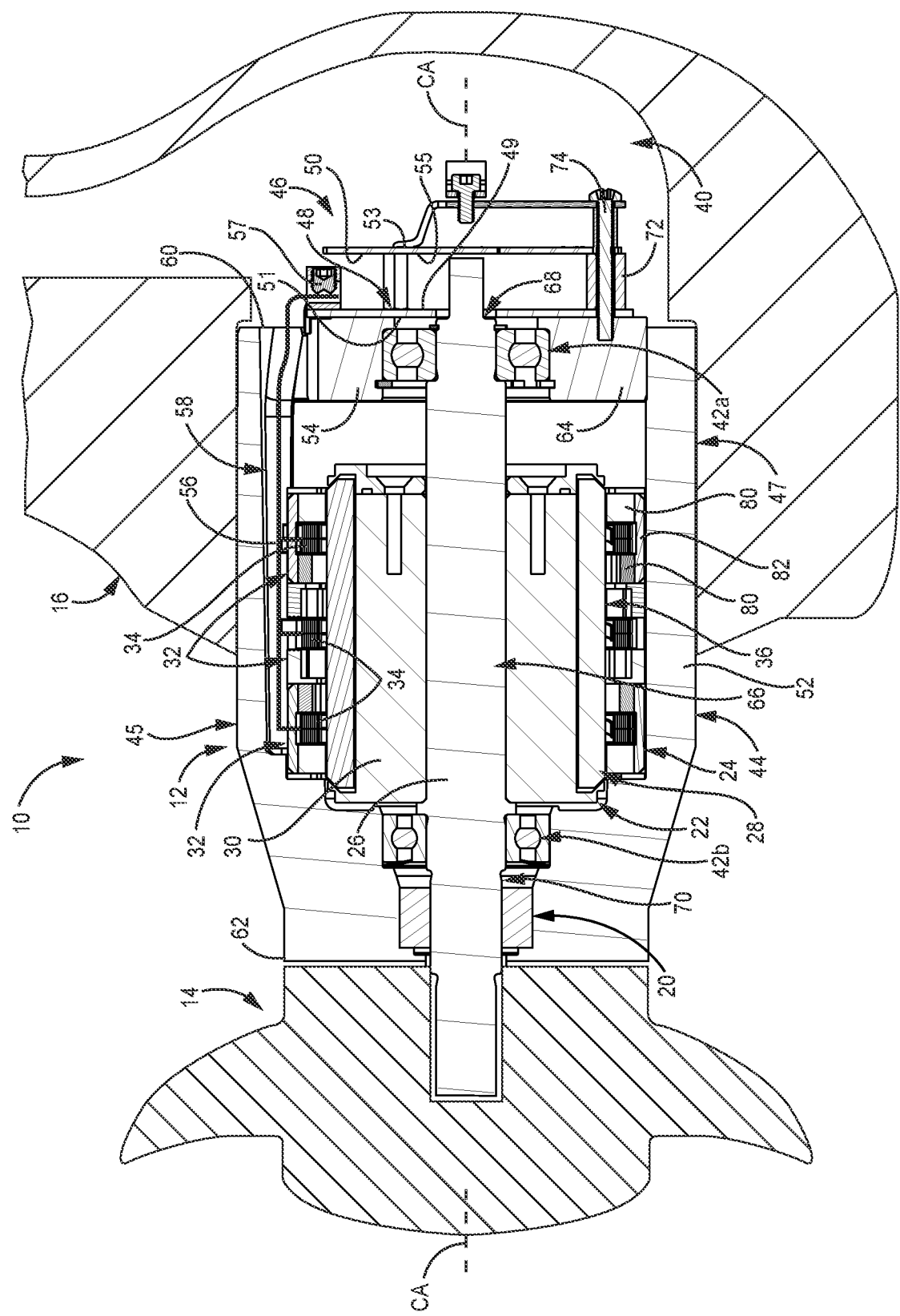
FIG. 3B is a cross-sectional view of a portion of a marine propulsion system.

FIG. 3A is an isometric view of motor 12. FIG. 3B is a cross-sectional view of marine propulsion system 10 with motor 12. Marine propulsion system 10 includes motor 12, propeller 14, support 16, and seal assembly 20. Plenum 40 is formed within support 16. Motor 12 includes stator 24, rotor 22, drive shaft 26, bearings 42a, 42b, motor housing 44, and circuit board assembly 46. Circuit board assembly 46 includes first circuit board 48 and second circuit board 50.

Support 16 is configured to extend into an aquatic environment from a marine vessel, such as a boat or ship. Support 16, which can also be referred to as an arm or leg, is supported by the marine vessel, such as by the hull of the marine vessel. Support 16 can form a portion of an outboard motor or a maneuvering thruster, among other options. Support 16 can extend from a portion of the hull. Support 16 can be fully or partially submerged within the water.

Motor 12 is connected to and supported by support 16. More specifically, motor housing 44 is connected to support 16. Motor housing 44 is partially disposed within the support 16 and extends partially outside of the support 16. In the example shown, housing body 52 extends from the interior of support 16 to outside of support 16. Housing body 52 is thereby directly exposed to and in contact with the aquatic operating environment of marine propulsion system 10. Housing body 52 extends into plenum 40 at least partially defined by support 16. An outer axial portion 45 of motor housing 44 is thus disposed outside of the support 16 such that that outer portion 45 of motor housing 44 is in direct contact with the water of the aquatic environment. An inner axial portion 47 of motor housing 44 is disposed within support 16. In the example shown, the outer axial portion 45 is an aft portion of motor 12 and the inner axial portion 47 is a fore portion of motor 12. Motor housing 44 can be fully or partially submerged during operation. The liquid water provides a cooling source to motor 12 and functions as a heat sink for motor 12. Motor housing 44 being in direct contact with the liquid water facilitates efficient and quick cooling of motor 12. The efficient cooling facilitates high responsiveness and efficient operation of motor 12.

Stator 24 and rotor 22 are disposed within motor housing 44 and are supported by motor housing 44. Rotor 22 is disposed within stator 24 such that motor 12 is an inner rotator motor. Permanent magnet array 28 is mounted to rotor body 30. Drive shaft 26 is fixed to rotor body 30 to rotate with rotor body 30 on common axis CA. Air gap 36 is disposed radially between stator 24 and rotor 22. More specifically, air gap 36 is disposed radially between phase assemblies 32 and permanent magnet array 28.

As discussed in more detail below, stator 24 can include a plurality of phase assemblies 32, including flux rings 80, axial returns 82, and coils 34. Stator 24 is connected to a power source and controller 38 by wires 56. Wires 56 extend into motor 12 along the passage defined by notch 58. Notch 58 is formed radially between housing body 52 and phase assemblies 32. Notch 58 defines the axially elongate passage to facilitate wires 56 extending to the coil 34 of each phase assembly 32. In the example shown, inner portion 45 of motor housing 44 has a teardrop cross-sectional configuration to form notch 58 and facilitate wires 56 passing to stator 24.

Stator 24 is in direct contact with motor housing 44. Stator 24 can be rotationally fixed to motor housing 44 such that stator 24 is prevented from rotating relative to motor housing 44. For example, stator 24 can be fixed within motor housing 44 by a potting compound that embeds the phase assemblies 32 within motor housing 44. In some examples, the potting compound can be or include thermally conductive material(s). A body of stator 24 formed at least partially by the potting compound is in direct contact with the motor housing 44. The body of stator 24 supports phase assemblies 32. In some examples, portions of the phase assemblies 32, such as at least a part of axial returns 82, can be in direct contact with motor housing 44. In some examples, the potting compound adheres to the inner surface of motor housing 44 to rotationally fix stator 24. In the example shown, stator 24 is keyed to motor housing 44 to prevent rotation of stator 24 relative to motor housing 44. A projection from the body of stator 24 extends into at least a portion of notch 58. More specifically, the potting compound can flow into and fill notch 58 during the potting process. As such, the projection can be integrally formed with and by the body of stator 24, in some examples. The projection interfaces with notch 58 such that a notch and groove detent arrests relative rotational motion between stator 24 and motor housing 44, facilitating the rotational output to propeller 14. The keyed interface further provides a failsafe that facilitates continued operation of motor 12, e.g., in the event of delamination between stator 24 and motor housing 44.

The body of stator 24 directly interfaces with the housing body 52, at least a portion of which is in direct contact with the liquid water forming the aquatic heat sink (e.g., the outer portion 45). A radial line extending from common axis CA can pass directly from the body of stator 24, through housing body 52, and to the exterior of housing body 52. In some examples, no other components are disposed axially between the body of stator 24 and housing body 52. Stator 24 can be directly potted to housing body 52 such that stator 24 is connected to and supported by motor housing 44. The stator 24 is thereby held stationary on common axis CA by the housing body 52 that is directly exposed to the aquatic heat sink. The housing body 52 can thereby both structurally support stator 24 and form a part of the heat exchange assembly for cooling motor 12. Directly supporting the stator 24 by the heat exchanging motor housing 44 provides thermal benefits by providing a large heat exchange interface between stator 24 and motor housing 44 (e.g., fully cylindrically around common axis CA) with a short conduction path between stator 24 and the heat sink (e.g., the thickness of housing body 52).

End cap 54 is connected to housing body 52 to form motor housing 44. End cap 54 can be connected to housing body 52 in any desired manner, such as by a rotation lock, interfaced threading, fasteners, etc. End cap 54 encloses the first end 60 of motor 12. End cap 54 supports bearing 42*a* and circuit board assembly 46. End cap 54 directly contacts housing body 52. End cap 54 and housing body 52 can each be formed from thermally conductive material, such as metal or ceramic, among other options. A direct thermal path is formed between end cap 54 and housing body 52. In the example shown, end cap 54 includes an axial portion 64 that forms an elongate interface with housing body 52. The axial portion 64 enlarges the area of the direct interface between end cap 54 and housing body 52, further enhancing the heat transfer efficiency. End cap 54 and housing body 52 can be formed from the same or different materials. Housing body 52 can be generally cylindrical, facilitating efficient heat transfer from motor 12 between housing body 52 and the aquatic heat sink. In the example shown, the exterior of housing body 52 exposed to the aquatic heat sink is frusto-conical.

Drive shaft 26 is elongate along common axis CA. Intermediate portion 66 of drive shaft 26 extends through rotor body 30. Intermediate portion 66 of drive shaft 26 is connected to rotor body 30 to rotate with rotor body 30. Drive shaft 26 extends through and is supported by bearings 42*a*, 42*b*. First end portion 68 of drive shaft 26 extends through bearing 42*a*. Second end portion 70 of drive shaft 26 extends through and is rotationally supported by bearing 42*b*. Bearings 42*a*, 42*b* can be of any desired configuration for supporting rotation of rotor 22 and axial loads experienced by motor 12. For example, bearings 42*a*, 42*b* can be ball bearings, roller bearings, etc. In the example shown, bearing 42*b* has a smaller outer diameter (e.g., the diameter to the outer edge of the outer race) than bearing 42*a*. The outer race of bearing 42*b* interfaces with motor housing 44 and the inner race of bearing 42*b* interfaces with drive shaft 26. The outer race of bearing 42a interfaces with end cap 54 and the inner race interfaces with drive shaft 26.

Drive shaft 26 and rotor 22 rotate in a 1:1 relationship. Drive shaft 26 completes one revolution for every one revolution of rotor 22. In the example shown, propeller 14 is directly mounted to drive shaft 26 to rotate in a 1:1 relationship. Motor 12 thereby drives propeller 14 in a 1:1 relationship. The direct drive relationship provides high responsiveness and a large speed range relative to traditional outputs having reduction gearing.

First end portion 68 extends through end cap 54 from an interior of motor housing 44 to outside of motor housing 44. In the example shown, first end portion 68 extends through a portion of circuit board assembly 46. First end portion 68 extends through an aperture in first circuit board 48. More specifically, first end portion 68 extends through first circuit board 48, bearing 42a, and end cap 54. In the example shown, a distal end of first end portion 68 is disposed proximate second circuit board 50. A sensing interface can be formed between a first sensing component formed by or disposed on drive shaft 26 and a second sensing component formed on and/or supported by second circuit board 50. For example, a position sensor can be formed by the sensing components of the drive shaft 26 and second circuit board 50 to sense the rotational position of drive shaft 26, and thus the rotational position of rotor 22 and, in some examples, the rotational position of propeller 14. For example, the position sensor can include one or more Hall-effect sensors, among other options. One or more magnets can be mounted on or at least partially within drive shaft 26 and the sensing component (e.g., Hall-effect sensing component) can be disposed on second circuit board 50. Such an arrangement provides a compact sensing configuration that provides direct feedback regarding the rotational position of rotor 22, drive shaft 26, and propeller 14.

Circuit board assembly 46 is mounted to motor 12 and structurally supported by motor 12. Circuit board assembly 46 is mounted to first end 60 of motor 12. Components forming controller 38 can be formed on circuit board assembly 46. Controller 38 can thereby be disposed across one or both of first circuit board 48 and second circuit board 50. Circuit board assembly 46 is configured for efficient heat transfer away from circuit board assembly 46 and to aquatic heat sink. Circuit board assembly 46 is in direct contact with motor housing 44. Thermally conductive components of circuit board assembly 46 are in direct contact with thermally conductive portions of motor housing 44. In the example shown, circuit board assembly 46 is directly connected to end cap 54. First circuit board 48 is mounted to end cap 54. First circuit board 48 can be mounted such that an axial end face of first circuit board 48 interfaces with an opposing axial end face of motor housing 44. The direct contact between first circuit board 48 and end cap 54 creates a thermal pathway from circuit board assembly 46 through the thermally conductive motor housing 44 to the aquatic heat sink. The cross-sectional area of the interface between first circuit board 48 and motor housing 44 taken orthogonal to common axis CA can be up to the entire cross-sectional area of first circuit board 48 taken orthogonal to common axis CA. In some examples, the cross-sectional area of the interface can be up to 75% of the cross-sectional area of first circuit board 48 taken orthogonal to common axis CA. In some examples, the cross-sectional area of the interface can be up to 50% of the cross-sectional area of first circuit board 48 taken orthogonal to common axis CA. It is understood, however, that the interface can be of any desired size suitable for effectively cooling circuit board assembly 46. The relatively large cross-sectional area of the interface between motor housing 44 and circuit board assembly 46 facilitates efficient heat transfer due to the area of the direct interface.

Second circuit board 50 is axially spaced from first circuit board 48. Second circuit board 50 is spaced from first circuit board by posts 72. Fasteners 74 extend into posts 72 to secure second circuit board 50 to first circuit board 48. Posts 72 and, in some examples, fasteners 74 can be formed from thermally conductive material to conduct heat away from first circuit board 48 and second circuit board 50. Posts 72 are exposed to the air within plenum 40 and can exchange heat with that air. A direct thermal pathway is created from second circuit board 50, through posts 72, through first circuit board 48 and/or end cap 54, and to housing body 52 that is in contact with the heat sink of the aquatic environment.

The configuration of motor 12 provides efficient and effective cooling by the infinite heat sink provided by the aquatic environment. Electric components (e.g., one or more coils 34) are disposed at locations axially outside of support 16. A direct thermal conduction path is formed through motor 12 to cool circuit board assembly 46 and thus cool control components of motor 12. The electromagnetic components of motor 12 are submerged within the aquatic environment, fully surrounding the motor 12 by the heat sink. Direct thermal pathways are formed from the heat generating stator 24 to the heat sink through the motor housing 44 that also structurally supports stator 24 and rotationally fixes stator 24. The direct thermal pathways provide efficient cooling, preventing overheating of electric and control components of motor 12, facilitating longer operating periods, increased motor life, reduced costs, and improved responsiveness.

First circuit board 48 and second circuit board 50 are arranged to facilitate efficient heat transfer to motor housing 44 and out to the aquatic heat sink. First circuit board 48 can also be referred to as the power board. First circuit board 48 supports power regulating components of controller 38, such as one or more field effect transistors (FETs). The FETs modulate the power signals to coils 34 to thereby control generation of the electromagnetic flux that causes rotation of rotor 22 about common axis CA. In the example shown, wires 56 extend to stator 24 from connectors 57 disposed on first circuit board 48. The power to motor 12 is regulated by FETs such that FETs generate a significant amount of heat. First circuit board 48 can be referred to as the hot board while second circuit board 50 can be referred to as the cool board because the components of second circuit board 50 generate less heat than the first circuit board 48. The hot board generates more heat relative to the cool board.

First circuit board 48 is configured such that heat generating components (e.g., the FETs) are disposed on only one axial side of first circuit board 48. First circuit board 48 can be configured such that components can only be mounted on one axial side of first circuit board 48. First circuit board 48 is configured such that the heat generating components are mounted on first axial face 49 face of first circuit board 48 oriented away from motor 12. The second axial face 51 of first circuit board 48 is oriented towards motor 12 and can be in direct contact with motor housing 44. The heat generating components on first circuit board 48 are exposed to the air gap formed between first circuit board 48 and second circuit board 50. Second circuit board 50 is configured such that heat generating components can be mounted on one or both of the first axial face 53 and second axial face 55 of second circuit board 50. First axial face 53 is oriented away from motor 12 and second axial face 55 is oriented towards motor 12 and towards first circuit board 48. A gap is formed between first axial face 49 and second axial face 55.

In some examples, first circuit board 48 includes and/or is formed from an insulated metal substrate (IMS). For example, first circuit board 48 can be formed from an aluminum carrier, an insulation layer (e.g., polymer and/or ceramic), and copper foil. The heat generating components are mounted to the foil side and the carrier side interfaces with motor housing 44. The metallic components of the IMS first circuit board 48 are more thermally conductive than traditional printed circuit board arrangements. The configuration of first circuit board 48 facilitates efficient heat transfer away from the hot, power regulating components of circuit board assembly 46. A direct thermal pathway is formed between first circuit board 48 and motor housing 44.

Second circuit board 50 can be a printed circuit board (PCB). Second circuit board 50 can support processors, microcontrollers, and/or other control components of controller 38. Heat generating components, such as the processors, microcontrollers, etc., can be mounted on both axial faces of second circuit board 50. First circuit board 48 is a single-sided circuit board while second circuit board 50 can be a double-sided circuit board.

The lower power second circuit board 50 is spaced away from the higher power first circuit board 48 to provide an air gap therebetween. The air gap provides a thermal gap between second circuit board 50 and the first circuit board 48. The thermal conduction path from first circuit board 48 to the aquatic heat sink is through portions of the motor housing 44 extending axially away from second circuit board 50. Second circuit board 50 is spaced from first circuit board 48 in an opposite axial direction from the thermal conduction path extending from first circuit board 48 to the aquatic heat sink. Second circuit board 50 is thereby thermally separated from first circuit board 48 to inhibit thermal transfer from the relatively hotter first circuit board 48 to the relatively cooler second circuit board 50.

Circuit board assembly 46 facilitates modularity of motor 12. A common control board configuration can provide the control components across different sizes and variations of motor 12. For example, a common second circuit board 50 can be used for a forty horsepower configuration of motor 12 and for a five horsepower configuration of motor 12. The power board (e.g., first circuit board 48) can vary between the various motor configurations. A common control board (e.g., second circuit board 50) can be mounted via posts 72 and fasteners 74 to the end of the motor 12 and spaced from the first circuit board 48 regardless of the configuration of motor 12 and first circuit board 48. As such, less parts are required across various configurations of motors 12, thereby simplifying assembly and reducing costs.

Second end portion 70 of drive shaft 26 extends through seal assembly 20 and through an aperture in motor housing 44. Second end portion 70 is thereby disposed outside of the motor housing 44. In the example shown, propeller 14 is directly connected to drive shaft 26 and, more specifically, to second end portion 70. It is understood, however, that propeller 14 can be indirectly connected to drive shaft 26 in other examples, such as by bevel gearing disposed intermediate a propeller shaft supporting propeller 14 and drive shaft 26. In the example shown, drive shaft 26 forms the propeller shaft due to the direct interface between drive shaft 26 and propeller 14.

Seal assembly 20 is disposed at second end 62 of motor 12. In the example shown, seal assembly 20 is supported by motor housing 44. Seal assembly 20 extends around drive shaft 26 and provides a seal between the aquatic environment surrounding motor 12 and the interior of motor housing 44, within which the electric components of motor 12 are disposed. Seal assembly 20 allows drive shaft 26 to rotate relative to the sealing components of seal assembly 20 while drive shaft 26 also extends out of motor housing 44 between the dry interior and the wet exterior. Seal assembly 20 is disposed axially between the electronic components of motor 12 and propeller 14. Seal assembly 20 is disposed axially between the laminate components of stator 24 and propeller 14. A laminate portion of stator 24, such as a flux ring 80, is disposed axially between seal assembly 20 and the closest coil 34 to seal assembly 20. Seal assembly 20 is disposed axially between permanent magnet array 28 and propeller 14. The arrangements of seal assembly 20 relative to the one or more electromagnetic components of motor 12 facilitates a compact motor arrangement that provides high torque directly to propeller 14, thereby providing high responsiveness, high control, and a continuously variable speed range. Seal assembly 20 can also be referred to as a stuffing box.

During operation, power is modulated to phase assemblies 32 to electromagnetically drive rotation of rotor 22. The power regulating components of first circuit board 48 modulate the power signals to coils 34. Rotor 22 rotates on common axis CA, causing rotation of drive shaft 26 on common axis CA. Propeller 14 is disposed coaxially with motor 12 such that propeller 14 and rotor 22 both rotate coaxially on common axis CA. The common axis CA extends through the phase assemblies 32 such that each phase assembly 32 is disposed coaxially on common axis CA. Each coil 34 extends annularly around common axis CA and are disposed coaxially with other components on common axis CA. Propeller 14 is disposed coaxially with the motor supporting bearings 42a, 42b and with rotor 22 during operation. The configuration of motor 12 provides a compact arrangement providing a high torque output that facilitates efficient driving of propeller 14 to generate the propulsive output.

Motor 12 provides significant advantages. At least a portion of motor 12 is disposed submerged in and, in some examples, in direct contact with the aquatic environment of marine propulsion system 10. Exposing motor housing 44 directly to the aquatic environment utilizes the aquatic environment both as the motive liquid driven by marine propulsion system 10 and as a heat sink for motor 12. Heat generating components of motor 12 (e.g., stator 24 and circuit board assembly 46) have direct thermal pathways to the portions of motor housing 44 exposed to the aquatic environment. The direct thermal pathways facilitate efficient heat transfer, allowing for greater amounts of power to be utilized over longer times and for larger components to be utilized. Motor 12 can thereby generate greater output with a smaller package size, facilitating hydrodynamic shaping of support 16 and motor housing 44 into a single assembly. Stator 24 is also fully supported by and connected to motor housing 44, which motor housing 44 is directly exposed to the aquatic heat sink, further facilitating cooling of motor 12. The configuration of circuit board assembly 46 and direct interfacing between the first circuit board 48 and motor housing 44 further facilitate efficient cooling of motor 12.

Propeller 14 is disposed coaxially with stator 24 and with rotor 22. Propeller 14 can be directly mounted to drive shaft 26 to facilitate a 1:1 revolution ratio between propeller 14 and rotor 22. Directly driving propeller 14 provides high responsiveness and a large speed range due to no speed-reducing gears being disposed between propeller 14 and rotor 22. Direct driving of propeller 14 and the coaxial arrangement of propeller 14 and rotor 22 also reduce side loading on motor 12, thereby reducing friction, decreasing cost, and increasing the operational life of motor 12.

The compact configuration and direct drive arrangement removes wear components, such as gearing, from the drive arrangement. Removal of such wear components reduces the need for servicing and decreasing complexity, thereby reducing cost and eliminating the need to track and manage various replacement parts.

Marine propulsion system 10 has a compact motor assembly that is particularly useful in marine propulsion applications. The compact configuration of and the high-torque output from motor 12 facilitates alignment on common axis CA with motor 12, allowing for direct driving, thereby removing wear components, such as gearing, and decreasing the complexity of the drive arrangement. In addition, the compact configuration and high-torque output facilitates integrating motor housing 44 into the water-contacting potion of marine propulsion system 10, providing direct contact between the heat generating motor 12 and the heat sink of the water. The direct contact provides more efficient cooling, allowing motor 12 to be operated at higher power (e.g., one or both of current and voltage), thereby increasing torque and/or speed output to propeller 14. The increased torque and/or speed provides a highly responsive marine propulsion system 10, facilitating high degrees of maneuverability and control in both high-speed and low-speed environments. Generating high torque at low speeds can be particularly useful when trolling, especially in certain aquatic environments such as those with heavy aquatic flora as the high torque output can counteract tangling. Motor 12 can also provide an infinitely variable speed output, providing greater control and responsiveness by marine propulsion system 10.

Figure 4A:
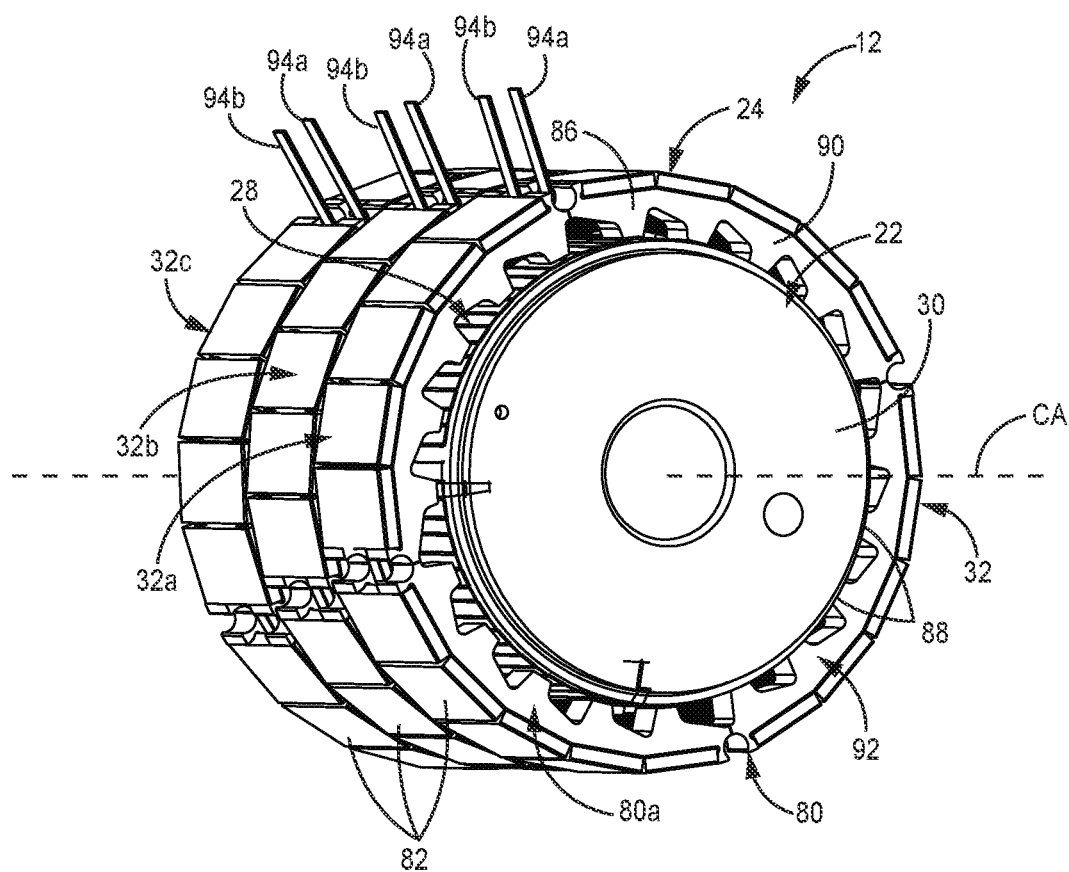
FIG. 4A is an isometric view showing parts of a motor in isolation.
Figure 4B:
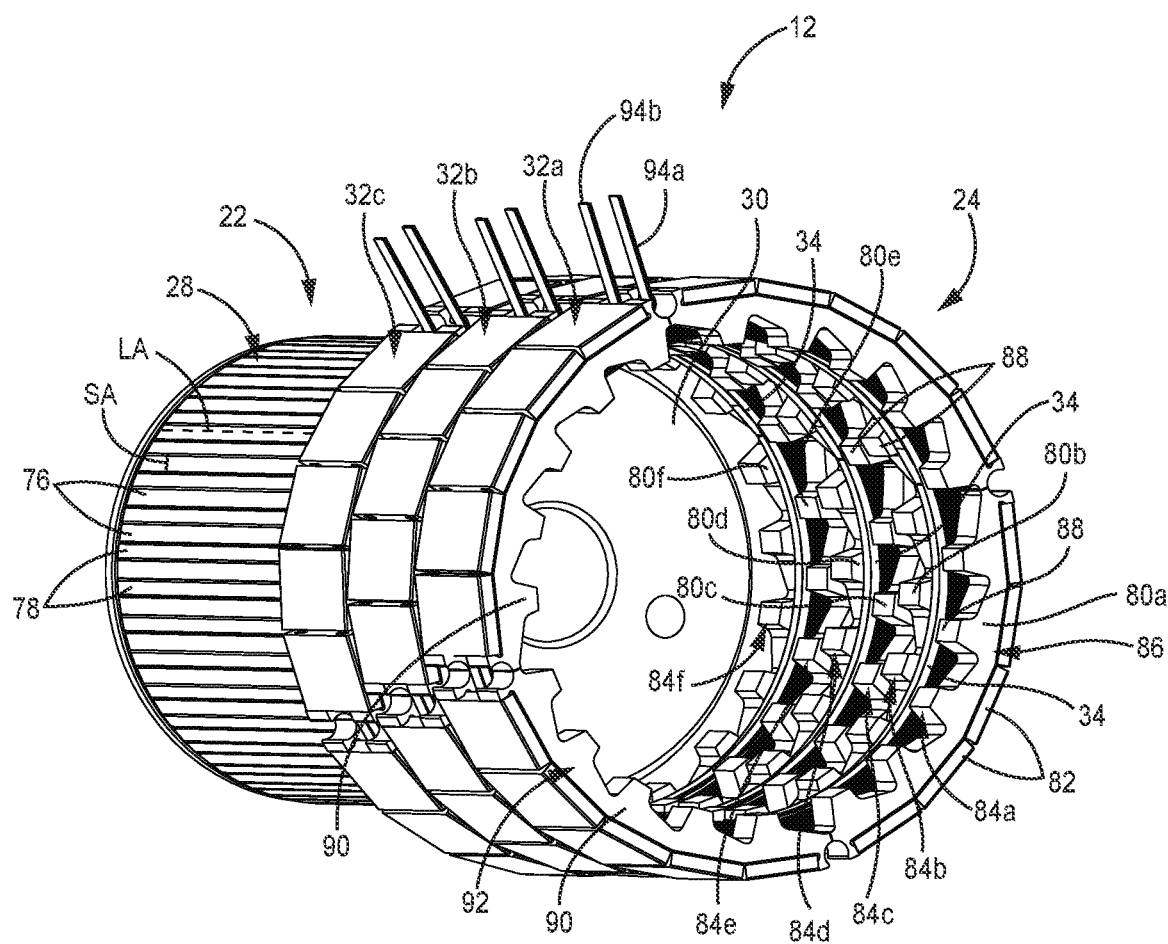
FIG. 4B is an isometric partially exploded view of the motor shown in FIG. 4A.
Figure 4C:
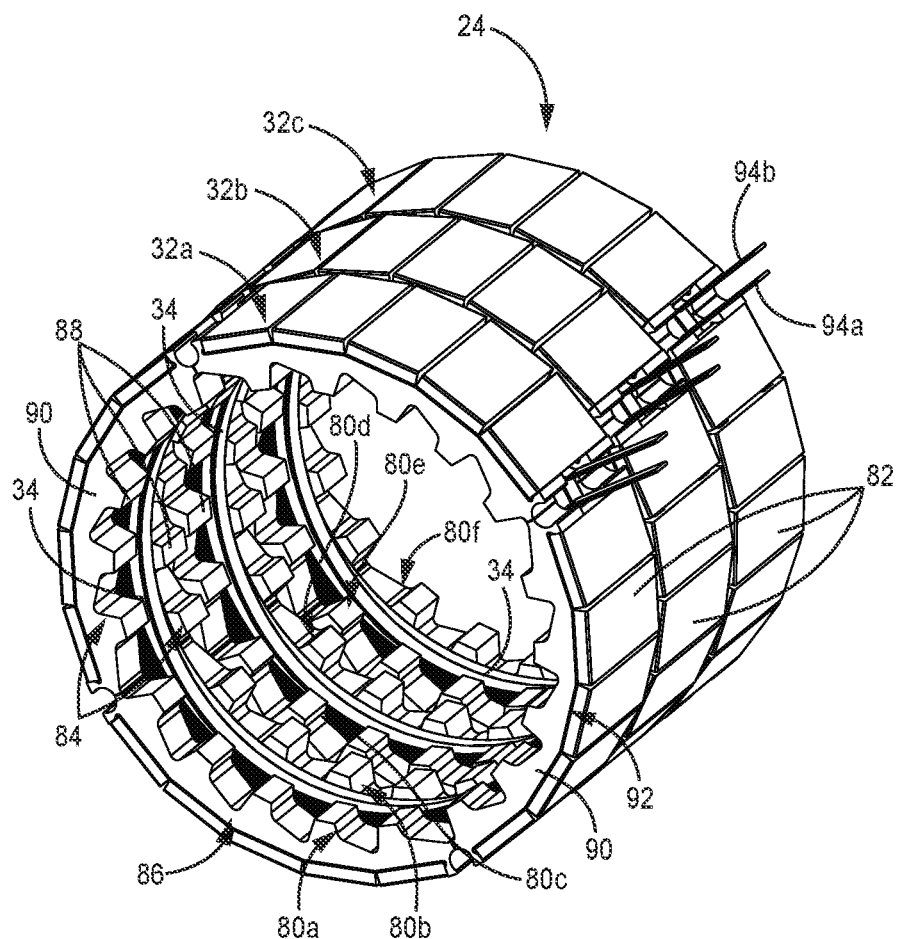
FIG. 4C is an isometric view of a stator of the motor shown in FIG. 4A.

FIG. 4A is an isometric view showing parts of motor 12 in isolation. FIG. 4B is an isometric view showing the rotor 22 partially exploded away from stator 24. FIG. 4C is an isometric view of stator 24. FIGS. 4A-4C will be discussed together. The motor 12 includes a stator 24 surrounding rotor 22. Drive shaft 26 is supported by rotor body 48. Permanent magnet array 28 and rotor body 30 of rotor 22 are shown. Permanent magnet array 28 includes magnets 76 and concentrators 78. Stator 24 includes phase assemblies 32a-32c (collectively herein "phase assembly 32" or "phase assemblies 32"). Phase assembly 32a includes coil 34; a pair of flux rings 80a, 80b; and axial returns 82. Phase assembly 32b includes coil 34; a pair of flux rings 80c, 80d; and axial returns 82. Phase assembly 32c includes coil 34; a pair of flux rings 80e, 80f; and axial returns 82. Each flux ring 80a-80f (collectively herein "flux ring 80" or "flux rings 80") includes a circular spur array 84a-84f (collectively herein "circular spur array 84" or "circular spur arrays 84"), respectively. Each flux ring 80a-80f includes a laminate piece 86 and plurality of spurs 88.

The motor 12 is located along the common axis CA. More specifically, the motor 12 has a cylindrical profile that is coaxial with the common axis CA. Each of the stator 24 and the rotor 22 also have cylindrical profiles coaxial with the common axis CA. The rotor 22 is driven by the stator 24 to rotate coaxially about the common axis CA. While the rotor 22 is disposed radially within the stator 24 such that the stator 24 is disposed circumferentially around the rotor 22 in this embodiment, the rotor 22 may instead be located around the stator 24 in alternative embodiments. The principles of operation of the motor 12, and the structure of the rotor 22 and stator 24, can be similar whether the rotor 22 is within the stator 24 or around the stator 24. So, while the below discussion refers to an embodiment where the rotor 22 rotates within the stator 24, such that motor 12 is an inner rotator motor, the teachings equally apply to embodiments in which the rotor 22 rotates around the stator 24.

In the illustrated embodiment, the rotor 22 includes a permanent magnet array 28. The permanent magnet array 28 includes a plurality of permanent magnets 76. The plurality of magnets 76 are annularly arrayed about the common axis CA. More specifically, the tubular array of the plurality of magnets 76 is coaxial with the common axis CA. The plurality of magnets 76 are circumferentially arrayed about the common axis CA. The plurality of magnets 76 are circumferentially arrayed about the rotor body 30.

Each magnet 76 has a long axis, as indicated in FIG. 4B, the long axis LA orientated axially (parallel with the common axis CA). Each magnet 76 has a short axis SA, as indicated in FIG. 4B, the short axis SA orientated orthogonal to the long axis LA, and tangentially with respect to the rotor 22. The short axis SA of each magnet 76 can be oriented tangentially to a circle centered on the common axis CA. Each magnet 76 has permanent poles, north and south, that are circumferentially orientated. More specifically, each magnet 76 has a north pole at one end of the short axis SA and a south pole at the opposite end of the short axis SA. Each of the north pole and south pole extends the length of the long axis LA, such that the north and south poles are divided by an axial interface along the long axis LA. The north and south poles of each magnet 76 are not axially orientated in the way that magnets are typically divided to the north and south poles at opposite ends of their long axis LA. In the illustrated embodiment, the plurality of magnets 76 are annularly arrayed within the stator 24, but as previously mentioned the plurality of magnets 76 could be annularly arrayed about the stator 24. The stator 24 may not include any permanent magnets but rather is an electromagnet that generates a magnetic field when electrically energized by coils 34 as further described herein. Likewise, the rotor 22 may include only permanent magnets and not include any electromagnets.

The rotor 22 further includes a plurality of concentrators 78. The plurality of concentrators 78 are interleaved with the plurality of magnets 76 to form the permanent magnet array 28. In this way, none of the magnets 76 physically contact another magnet 76 and none of the magnets 76 are physically adjacent to another magnet 76. The magnets 76 are nevertheless physically fixed by the plurality of concentrators 78. The plurality of concentrators 78 are orientated axially, such that the long axis of each concentrator 78 is parallel with the common axis CA. The long axis of each concentrator 78 is parallel to the long axis LA of each magnet 76. Each concentrator 78 can be formed by stacked laminations. The long axis of each lamination is orientated parallel with the common axis CA. As such, the grain of the stack of laminations is oriented axially.

Each magnet 76 extends parallel with the common axis. Each magnet 76 can span, and magnetically interact with, multiple phases of the stator 24. For example, each magnet 76 can radially overlap with multiple coils 34 and multiple annular arrays of spurs 88. Each concentrator 78 extends parallel with the common axis CA. Each concentrator 78 can span, and magnetically interact with, multiple phases of the stator 24. For example, each concentrator 78 can radially overlap with multiple coils 34 and annular arrays of spurs 88.

Laminations can be formed from material which is readily susceptible to polarization from the fields generated by coils. Such material is typically ferromagnetic. The ferromagnetic materials can be metal such as iron or an alloy of iron, such as steel. More specially, laminations can be formed from silicon steel, among other options. Ferromagnetic material can be a ceramic doped or otherwise embedded with ferromagnetic elements.

Stator 24 comprises a plurality of spurs 88. Each spur 88 projects toward the rotor 22. For example, each spur 88 projects radially (orthogonal) towards the common axis CA and towards the rotor 22. In this embodiment, each spur 88 is a structure that narrows toward the rotor 22 to focus concentrated flux to a limited part of the rotor 22. More specifically, the circumferential width of each spur 88 narrows as the spur 88 extends radially relative to the stator 24 and towards the rotor 22. In some embodiments, the spurs 88 may not narrow toward the rotor 22 but nevertheless may concentrate flux toward the rotor 22. The spurs 88 project inward towards the common axis CA in this embodiment because the rotor 22 is located radially within the stator 24. However, in alternative outer rotor 22 embodiments, the spurs 88 can project outward towards such rotor 22 and away from the common axis CA.

The plurality of spurs 88 are arrayed to have a tubular profile. More specifically, the plurality of spurs 88 are arrayed annularly about the common axis CA and arrayed axially along the common axis CA. In this way, the stator 24 comprises a plurality of circular spur arrays 84a-84f. The embodiment of FIG. 4B shows six circular spur arrays 84a-84f, the six circular spur arrays 84a-84f arrayed along the common axis CA. The plurality of circular spur arrays 84a-84f are arrayed along the common axis CA. Each circular spur array 84a-84f is coaxial with the common axis CA. The plurality of circular spur arrays 84a-84f define a cylinder coaxial with the common axis CA. The spurs 88 do not necessarily project into an air gap away from other physical components of the stator 24. Rather, the spurs 88 may be partially or fully embedded in a potting compound such as epoxy. For example, the stator 88 can have a cylindrical interior with the spurs 88 located inside and/or exposed on the cylindrical interior surface, but the spurs 88 nevertheless function to focus electromagnetic flux relative to the surrounding potting material.

In this embodiment, the circular spur arrays 84a-84f are part of the plurality of flux rings 80a-80f, respectively. Each flux ring 80 supports all of the spurs 88 of the respective circular spur array 84 of that flux ring 80. For example, flux ring 80a supports all of the spurs 88 of circular spur array 84a. Flux rings 80 are each at least partially formed from laminate. Each flux ring 80a-80f can be a contiguous laminate piece or formed from a plurality of laminate pieces arrayed about the common axis CA. In this embodiment, each flux ring 80a-80f includes a plurality of branches 90 forming a hoop 92 about common axis CA.

For each flux ring 80, the hoop 92 extends fully about common axis CA as a ring. Each branch 90 extend partially circumferentially around common axis CA. The multiple branches 90 together from the hoop 92 in the example shown. Branches 90 can be directly connected and/or supported by other structure, such as being connected by epoxy or other potting compound. In the example shown, multiple laminate pieces are assembled together to form each circular flux ring 80 and/or circular spur array 84, such as by a plurality of arc portions that assemble together. It is understood that, in some examples, hoop 92 can be formed as a unitary component extending fully about common axis CA.

Each hoop 92 is coaxial with the common axis CA. Whether assembled from discrete laminate pieces each supporting multiple but not all spurs 88 of a circular spur array 84 or formed from a contiguous laminate that supports all spurs 88 of a circular spur array 84, the circular spur arrays 84a-84f are supported by flux rings 80a-80f that allow flow of flux between circumferentially adjacent ones of spurs 88. The plurality of flux rings 80a-80f are arrayed along and about the common axis CA. Each flux ring 80a-80f is coaxial with the common axis CA. The laminate pieces 86 forming the flux rings 80a-80f form at least a part of the spurs 88. In the example show, spurs 88 are fully formed from the laminate. It is understood that, in some examples, spurs 88 can be formed from the laminate and a tip component formed from powdered metal. Having a powdered metal portion can be ideal in some embodiments due to powdered metal lacking directional grain. In some examples, the tip component, whether formed from laminate or powdered metal, can extend axially relative to the main body portion of the spur 88. For example, the tip component can extend axially over the coil 34 such that at least a portion of the tip component, and thus at least a portion of the spur 88, is disposed radially between rotor 22 and coil 34. As such, each spur 88 can be formed partially or entirely by laminate, such as by the laminate piece 86 of its associated flux ring 80. As shown, multiple circumferentially adjacent spurs 88 of a common flux ring 80 are formed by a single, common laminate piece 86.

Each spur 88 can be contiguous with the branch 90 and, in some examples, the hoop 92 of its flux ring 80. In this way, the spurs 88, branches 90, and/or the hoops 92 of a single flux ring 80 can be formed from a single laminate piece or by multiple laminate pieces. Each spur 88 of a spur array 84 can thereby be formed by a common laminate piece. In the embodiment shown, the laminate pieces 86 forming the flux rings 80a-80f are formed by non-contiguous pieces. As such, the laminate portion of each flux ring 80a-80f is formed by non-contiguous laminate. The spurs 88, branches 90, and/or the hoops 92 can have a laminate grain that extends radially (e.g., is orthogonal) with respect to the common axis CA. Such laminate grain may be only radially orientated.

As shown in FIG. 4C, the stator 24 is formed from an array of phase assemblies 32a-32c. The phase assemblies 32a-32c are arrayed along the common axis CA. Each phase assembly 32a-32c includes a pair of circular spur arrays 84a-84b, 84c-84d, 84e-84f, respectively. As such, phase assembly 32a includes paired circular spur arrays 84a, 84b; phase assembly 32b includes paired circular spur arrays 84c, 84d; and phase assembly 32c includes paired circular spur arrays 84e, 84f. In this embodiment, each phase assembly 32a-32c includes a pair of flux rings 80a-80b, 80c-80d, 80e-80f, respectively. Each pair of circular spur arrays 84a-84b, 84c-84d, 84e-84f, are respectively connected by axial returns 82. Each pair of flux rings 80a-80b, 80c-80d, 80e-80f, are respectively connected by the axial returns 82.

Each phase assembly 32 includes a coil 34 disposed axially between the paired flux rings 80 of that phase assembly 32. The coils 34 extend circumferentially about the common axis CA such that the common axis CA extends through the ring formed by each coil 34. The coils 34 are disposed axially between laminate portions of each phase assembly 32. Each coil 34 is thereby bracketed by laminate stacks.

The axial returns 82 extend between and connect the paired flux rings 80 forming a phase assembly 32 (e.g., flux rings 82a, 82b of phase assembly 32a). The axial returns 82 are disposed about common axis CA and form a circular array of axial returns 82 for each phase assembly 32. The axial returns 82 are disposed on an opposite radial side of coils 34 from rotor 22. The axial returns 82 are disposed on an opposite radial side of coils 34 from permanent magnet array 28. The array of axial returns 82 defines a cylinder through which the common axis CA extends. The axial returns 82 are disposed on an opposite radial side of branches 90 from spurs 88. The axial returns 82 can be in direct contact with the laminate of each flux ring 80 of a phase assembly 32. For example, each axial return 82 can directly contact the radial side of each branch 90 opposite the spurs 88. In the example shown, axial returns 82 directly contact the radially outer side of each branch 90 because motor 12 in an inner rotator. In the example shown, axial returns 82 form the radially outermost portion of motor 12. Axial returns 82 can form the radially outermost flux-conducting portion of motor 12. Axial returns 82 can form the radially outermost portion of motor 12 formed by laminate.

Each axial return 82 is formed by a stack of laminations that have a grain orientation that is axial (i.e. parallel with the common axis CA). The laminate grain of the axial returns 82 may only be axial. The laminate grain of the axial returns 82 can thereby be orthogonal to the laminate grain of the laminate forming flux rings 80. As such, motor 12 can include one or more arrays of axially-oriented laminations disposed about common axis CA. The one or more arrays of axially-oriented laminations define cylinders that are coaxial with common axis CA and are thus coaxial with each other. Rotor 22, rotor body 30, permanent magnet array 28, and spurs 88 can all be disposed radially within one or more of the cylinders formed by axial returns 82. As further explained herein, the axial returns 82 conduct electromagnetic flux between each flux ring 80 of the pair of flux rings 80 forming a phase assembly 32. In the example shown, a first array of axial returns 82 conducts electromagnetic flux between the paired flux rings 80a-80b; a second array of axial returns 82 conducts electromagnetic flux between the paired flux rings 80c-80d; and a third array of axial returns conducts electromagnetic flux between the paired flux rings 80e-80f. The axial returns 82 conduct electromagnetic flux between the paired flux rings 80 of each phase assembly 32. Likewise, the axial returns 82 conduct electromagnetic flux between each pair of circular spur arrays 84a-84b, 84c-84d, 84e-84f. Likewise, the axial returns 82 conduct electromagnetic flux between axially adjacent branches 90 of paired ones of the flux rings 80. As further explained herein, the spurs 88 of paired flux rings 80a-80b, 80c-80d, 80e-80f and thus of paired circular spur arrays 84a-84b, 84c-84d, 84d-84f form a plurality of flux circuits through the stator 24 that magnetically acts on the magnets 76 of the rotor 22 to rotate the rotor 34 relative to the stator 24.

The closest flux ring 80 and/or laminate piece 86 and/or spur 88 (or other laminate structure that routes flux to a magnet 76) to the propeller 14 along common axis CA is axially closer than the closest coil 34 along common axis CA. This is because, in part, there are no end turns of the coils that extend axially relative to the motor 12, as discussed in more detail below.

Figure 5A:
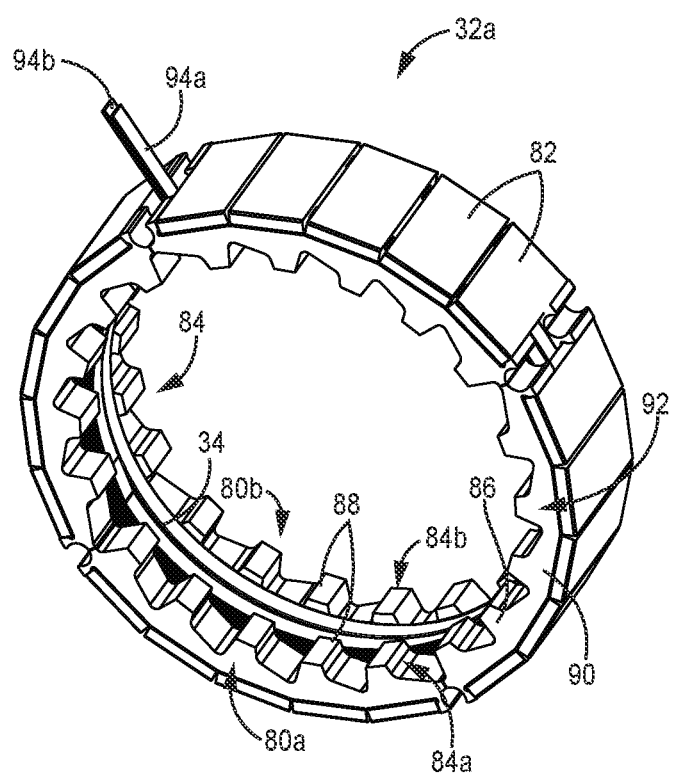
FIG. 5A is an isometric view of a phase assembly of the stator shown in FIG. 4B.
Figure 5B:
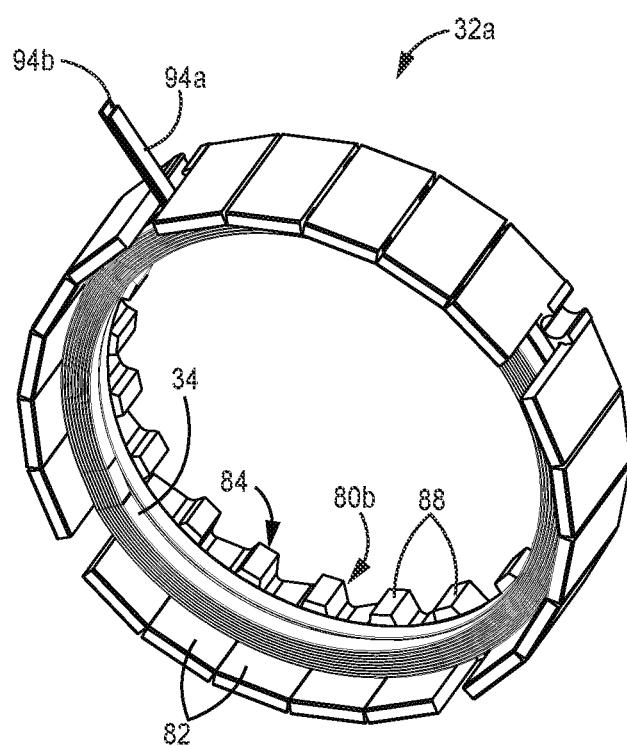
FIG. 5B is an isometric view of the phase assembly shown in FIG. 6A with a flux ring removed for clarity.

FIG. 5A is an isometric view of phase assembly 32a. FIG. 5B is an isometric view of phase assembly 32a with flux ring 80a removed for clarity. FIGS. 5A and 5B will be discussed together. While phase assembly 32a is shown and discussed in more detail, it is understood that the other phase assemblies 32b, 32c (best seen in FIG. 4C) can be structurally and functionally identical, the only difference being that the signals delivered through the coils 34 of the phase assemblies 32a-32c are out of phase with respect to each other. In addition, the phase assemblies 32a-32c can be rotated about common axis CA relative to each other to form stator 24. Flux ring 80a includes circular spur array 84a, branches 90a, hoop 92a, and spurs 88a. Flux ring 80b includes circular spur array 84b, branches 90b, hoop 92b, and spurs 88b.

The phase assembly 32a is formed by a pair of paired flux rings 80a, 80b with a coil 34 sandwiched axially between the paired flux rings 80a-80b. Each coil 34 is a winding, typically copper, around the common axis CA. Thus, each coil 34 could be a continuous winding of 20, 30, 40, 32, 100, or less or more loops around the common axis CA. For example, each coil 34 can be a winding of ribbon or wire. Each coil 34 has two termination wires 94a, 94b representing the ends of the circuit of each coil 34. Wire ends 94a, 94b of the coil 34 for running an AC signal through the coil 34 can electrically connect with controller 38, such as via wires 56 (FIG. 3B).

Coil 34 is disposed directly between the paired flux rings 80a, 80b. Coil 34 is disposed in an axial gap formed between the paired flux rings 80a, 80b. More specifically, the coil 34 is directly between the laminate stacks that form the flux ring 80a and the lamination stacks that form the flux ring 80b. At least a portion of the coil 34 is directly between opposed branches 90a, 90b of the paired flux rings 80a, 80b. At least a portion of the coil 34 is directly between parts of each pair of spurs 88a, 88b of the paired circular spur arrays 84a, 84b (e.g., spurs 88a of spur array 84a and spurs 88b of spur array 84b). The coil 34 is directly axially between the parts of the paired circular spur arrays 84a, 84b that are formed by laminate. As such, the coil 34 is axially bracketed by laminate.

The coil 34 radially overlaps with the axial returns 82. In the example shown, coil 34 is disposed in an annular, U-shaped chamber coaxial with the common axis CA and defined by axial returns 82 and flux rings 80a, 80b. The chamber is open towards rotor 22. In the example shown, the three closed sides of the annular chamber (e.g., the two axial sides and one of the radial sides) are formed by laminate. In some examples, all four sides of the chamber can be closed. The fourth side can be formed by powdered metal components of the spurs 88 or by laminate of the spurs 88.

Figure 6A:
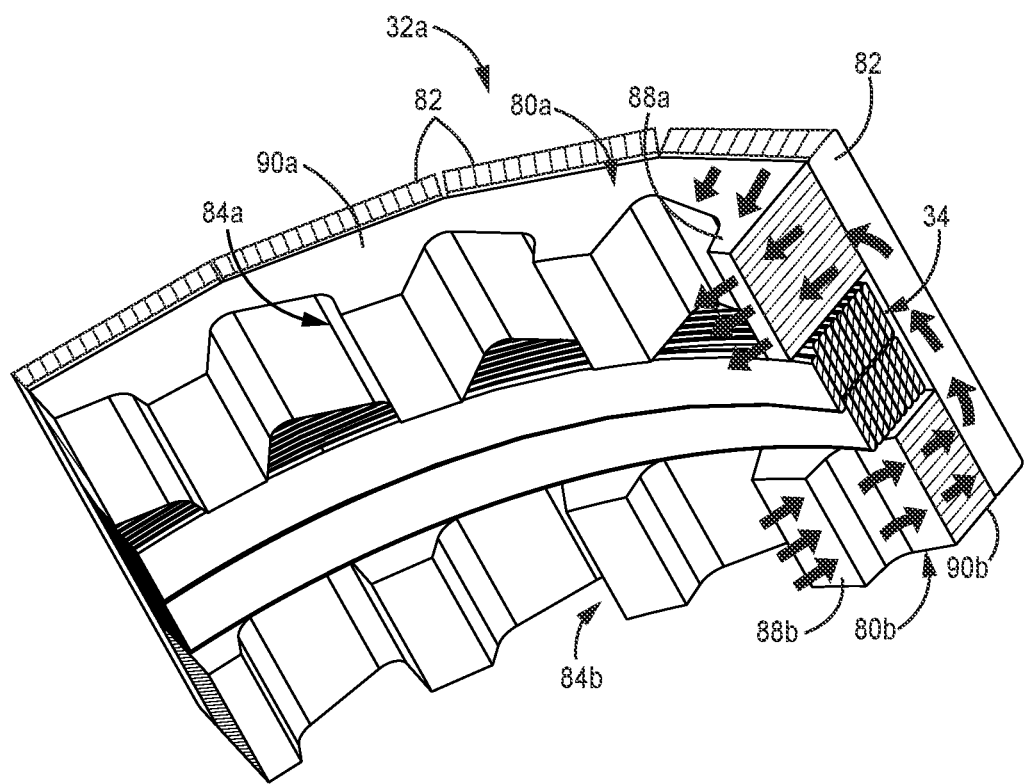
FIG. 6A is an enlarged cross-sectional view showing electric flux flow through the phase assembly.
Figure 6B:
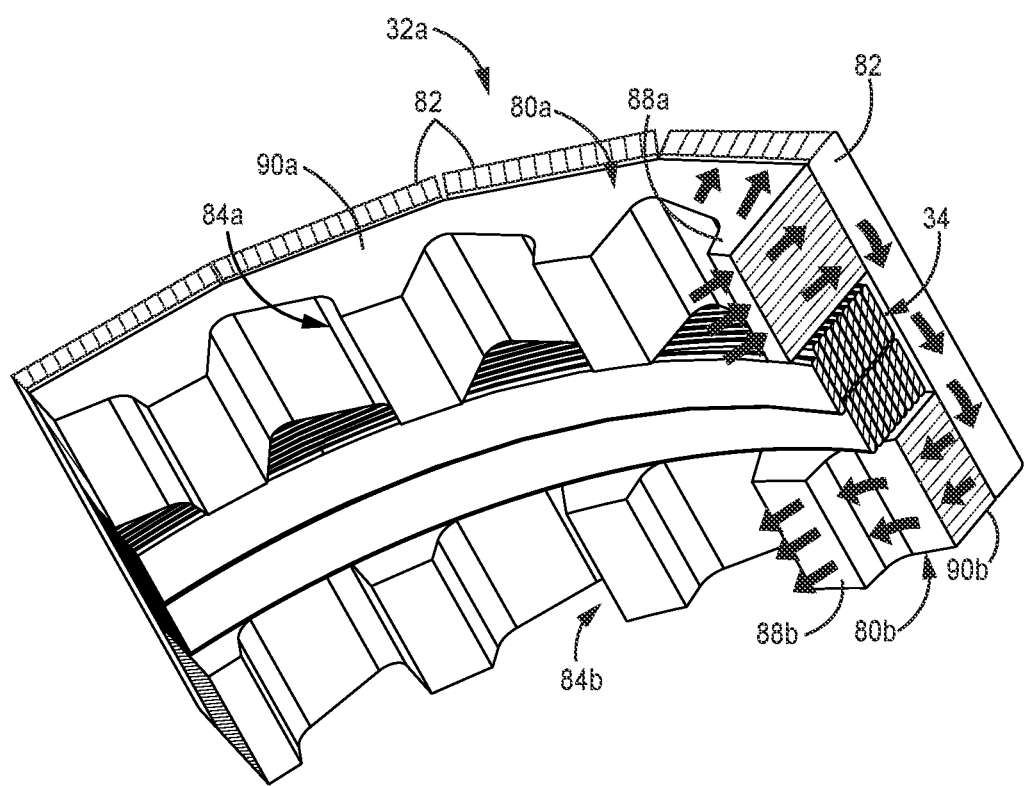
FIG. 6B is an enlarged cross-sectional view showing electric flux flow opposite to that shown in FIG. 6A.

FIGS. 6A and 6B demonstrate how flux circuits are formed through flux paired ones of spurs 88a, 88b. FIG. 6C shows a detailed view of flux paired spurs 88a, 88b of phase assembly 32a interacting with permanent magnet array 28 of rotor 22. FIGS. 6A-6C will be discussed together. Flux paired spurs refers to respective closest pairs of spurs 88 of the opposed circular spur arrays 84 of a phase assembly 32 (e.g., the closest pairs of spurs 88a, 88b of the opposed circular spur arrays 84a, 84b of the phase assembly 32a). While spurs 88a, 88b are highlighted as flux paired ones of spurs in FIGS. 6A-6C, it is understood that these are examples and all spurs 88a, 88b of flux rings 80a, 80b similarly flux pair across the circular spur arrays 84a, 84b.

Each spur 88a is part of a similar flux circuit with its corresponding flux pair spur 88b. The flux paired spurs 88a, 88b pair generally axially with a spur 88a, 88b of the opposing circular spur array 84a, 84b, and not circumferentially to the neighbor spur 88a, 88b of the same circular spur array 84a, 84b because all spurs 88a of circular spur array 84a will have the same polarity at any given time while all spurs 88b of the opposed circular spur array 84b of the same phase assembly 32a will have the opposite polarity at any given time. More specifically, each spur 88a of circular spur array 84a flux pairs with the closest spur 88b of the circular spur array 88b on the other axial side of the coil 34. As shown in FIGS. 6A and 6B, a flux circuit is formed through flux paired spurs 88a, 88b such that the spurs 88a, 88b are respectively polarized, north and south.

The flux is generated by coils 34. Specifically, an AC signal is run through each coil 34 which rapidly builds and collapses the magnetic field due to the current reversal of the AC signal through the coil 34. As shown, flux concentrating material of the flux rings 80a, 80b and axial returns 82 is wrapped around at least three sides of the coil 34. The lamination grain of the flux concentrating material is shown in FIGS. 6A and 6B. Generally, flux flows with the grain, along the direction of lamination, as flux will generally follow the path of highest permeability and there is significant resistance to flux jumping from one layer of lamination to another layer of lamination. The lamination grain of the branches 90a, 90b, including the spurs 88a, 88b, is radially orientated while the lamination grain of the axial returns 82 is axially oriented. As such, the flux flows axially through the axial returns 82 and radially through the branches 90a, 90b and spurs 88a, 88b in a U shape toward the rotor 22, the base of the U on an opposite side of the coil 34 from the rotor 22 and the legs of the U oriented towards the rotor 22. FIGS. 6A and 6B represent the reversal of the AC signal and how the poles of the flux paired spurs 88a, 88b are switched.

The flux paired ones of spurs 88a, 88b are circumferentially offset from each other such that the spurs 88a are not axially aligned with spurs 88b. Being that the ends of the flux paired spurs 88a, 88b are not aligned axially because spurs 88a are offset circumferentially from spurs 88b, the flux circuit travels at least a limited distance circumferentially between the flux paired ones of spurs 88a, 88b. Therefore, a cumulative flux circuit comprised of a plurality of flux paired spurs 88a, 88b can flow in a spiral pattern circumferentially through the spurs 88a, 88b and axial returns 82. It is noted that, while most flux flows between flux paired ones of spurs 88a, 88b, the branches 90a, 90b permit flux flow between spurs 88a, 88b of the same branch 90a, 90b, such that a limited amount of flux may skip a flux paired spur 88a, 88b to the next-over spur 88a, 88b of the same branch 90a, 90b.

FIG. 6C shows a detailed view of flux paired spurs 88a, 88b of the stator 24 interacting with concentrators 78 and magnets 76 of the rotor 22. The AC signal through the coil 34 changes the direction of the electric current rapidly and thus changes the north-south polarity of the flux paired spurs 88a, 88b rapidly. The view of FIG. 6C shows an instance in which all spurs 88a of the circular spur array 84a have a north polarization while all spurs 88b of the circular spur array 84b have a south polarization. Also at this instance, the spurs 88a, 88b are aligned with the concentrators 78 that are disposed circumferentially between the magnets 76. The laminate of the concentrators 78 does not have an inherent polarization, but due to the fixed position of concentrators 78 between magnet poles, the concentrators 78 assume an effective permanent polarization as indicated. Each concentrator 78 contacts two magnets 76. Each concentrator 78 contacts the same pole of the two magnets 76. For example, a concentrator 78 will be in contact with two south poles or in contact with two north poles. The concentrators 78 take on alternating north and south polarization on opposite sides of each magnet 76 depending on the polarization adjacent that concentrator 78. As indicated, each magnet 76 is permanently polarized north and south on opposite sides of its short axis. The interleaved arrangement of magnets 76 and concentrators 78 creates oppositely polarized concentrators 78 and magnet 76 poles.

The concentrators 78 route the magnetic flux from the magnets 76 toward the stator 24. Flux circuits are completed across the air gap 60 between the stator 24 and rotor 22. The flux from the rotor 22 (specifically the magnets 76) and the flux from the coil 34 (through the spurs 88a, 88b) interact in the air gap 36, and the resulting flux shear forces rotation of the rotor 22. The flux of the present motor 12 has an orientation transverse to the axis of rotation (which axis of rotation is coaxial with common axis CA). This is different from the radial flux orientation of traditional AC and DC brushless motors.

The flux generated by the stator 24 and acting on the rotor 22 is constantly changing due to both changing position of the magnets 76 and concentrators 78 due to rotation of the rotor 22 as well as the change in polarization of the spurs 88a, 88b due to the change in the AC signal through the coil 34. As such, the AC signal routed through the coil 34 is synchronized with rotation of the rotor 22 to develop magnetic fields through the spurs 88a, 88b in time to the concentrators 78 approaching and departing the spurs 88a, 88b to simultaneously push and pull the magnets 76 of the rotor 22 to provide the force that rotates the rotor 22. More specifically, the N-N and S-S interfaces repel, while N-S attract, on approach and departure of alignment.

At least some of the respective AC signals (e.g., sinusoidal or trapezoidal) delivered through the multiple coils 34 forming stator 24 are out of phase with respect to each other. In this way, the magnets 76 (along their lengths) more frequently have flux peaks acting on them, as compared to synchronizing the sinusoidal AC signals, for a smoother torque profile acting on the rotor 22 along the axis of rotation of the rotor 22, which is also the common axis CA. The embodiment of the motor 12 shown in FIGS. 2-7 include three phases corresponding to the three phase assemblies 32a-32c and the coils 34 therein in which three sinusoidal AC signals are delivered through the coils 34, 120-degrees electrically offset. If there were two phase assemblies 32 and two coils 34, then the two sinusoidal AC signals would be 180 degrees apart, or 90 degrees apart for sets of four phase assemblies 32. In some examples, motor 12 can include fewer sinusoidal AC signals than phase assemblies 32, such as three sinusoidal AC signals delivered to six phase assemblies 120-degrees electrically offset, as discussed in more detail below.

Being that the magnets 76 are elongate and radially overlap with multiple coils 34, each magnet 76 is electromagnetically acted upon by multiple ones of the coils 34. More specifically, each magnet 76 can be electromagnetically acted upon by three coils 34 simultaneously along the length of the magnet 80, in the example shown. As such, multiple different coils 34 can electromagnetically act on each magnet 76 simultaneously. Also, each magnet 76 may be electromagnetically acted upon by only three coils 34 (or only two coils 34 in a two-phase motor 12 embodiment, or only four coils 34 in a four-phase motor 12 embodiment, etc.) throughout operation. This is unlike conventional AC induction motors in which each magnet interacts will all windings of a traditional circumferential array of windings around the axis of rotation of the rotor. The motor 12 has multiple stator phases but continuous rotor phases due to each magnet 76 being symmetrical along its long axis.

Traditional AC induction motors use a plurality of discrete coils that form an array of coils that extend circumferentially around the axis of rotation of the rotor. Each coil represents a potential pole for acting on a magnet. The discrete coils arrayed circumferentially around the axis of rotation in a conventional AC induction motor are out of phase with respect to each other. The discrete coils can interact with a small subset of the magnets at any given instance. The potential torque generated is proportional to the number of poles. The number of poles in such a motor is limited by the ability to fit discrete coils circumferentially around the axis of rotation within the motor. Coil windings can be made smaller, and the diameter of the stator can be made bigger, to accommodate more coils to support more poles, but this increases the size, weight, and cost of the motor and still has limits. Power can also be increased when the rotor is rotating at a relatively high rate, whereby more coil-magnet passes can be experienced per unit time. But such power increase requires the motor to operate at relatively high speed, when some applications may desire low-speed output. Providing reduction gearing to reduce speed and increase torque to the desired high torque and low speed increases cost, weight, size, and friction.

Motors 12 according to the present disclosure are different from traditional AC and DC brushless motors. An aspect of the motor 12 is that it contains relatively few coils 34, only three in the illustrated embodiment. Unlike traditional AC and DC brushless motors, the coils 34 are formed from loops of wire that extend entirely around the axis of rotation of the rotor 22 (and the common axis CA). The axis of rotation of the rotor 22 (and the common axis CA) extends through each loop (e.g., the center of each loop). Each coil 34 is annular, and the loops of each coil 34 are likewise annular, and the circular planar profile of the coil 34 and loops are orthogonal to the common axis CA. The ribbon of each coil 34 forms a single hoop, which has multiple loops that overlap and contact one another to form the single hoop assembly. The coils 34 do not include loops that generate flux that rotates the rotor 22 through which the common axis CA does not extend. Instead of adding a coil for each pole as in traditional AC induction motors, the branches 90 and axial returns 82 surrounding a single coil 34 channel the flux to a plurality of spurs 88 which flux pair across the branches 90 to create a plurality of poles from the single coil 34. In the example shown, for each phase assembly 32 one coil 34 supports twenty-five poles as the example flux rings 80 each include twenty-five spurs 88, although lower and higher poles can be created depending on the number of spurs 88 of the circular spur arrays 76. As such, activating one coil 34 activates many poles, whereas in some traditional AC and DC brushless motors activation of one coil activates only one pole. In some examples, each coil 34 can interact with each magnet 76 at a given instance. Moreover, multiple coils 34 are arrayed along the axis of rotation of the rotor 22 as part of multiple phase assemblies 32, thereby multiplying the number of poles.

The high pole count eliminates or reduces the need for reduction gearing, further reducing off-center forces as well as reducing weight and friction, allowing for a more compact arrangement of marine propulsion system 10. The motors 12 of the present disclose can generate high torque with a small package size, even at low speed where marine propulsion systems 10 can operate, especially during certain boating activities. Therefore, gear reduction of a drive can be minimized or entirely excluded, providing savings on cost, size, weight, and friction.

The closest flux ring 80 and/or laminate piece 86 and/or spur 88 (or other laminate structure that routes flux to a magnet 76) to the propeller 14 along common axis CA is located at an axial location closer to propeller 14 than the axially closest coil 34. This is because, in part, there are no end turns of the coils 34 that extend axially. Marine propulsion system 10 thereby provides a compact, efficient pumping arrangement.

Figure 7:
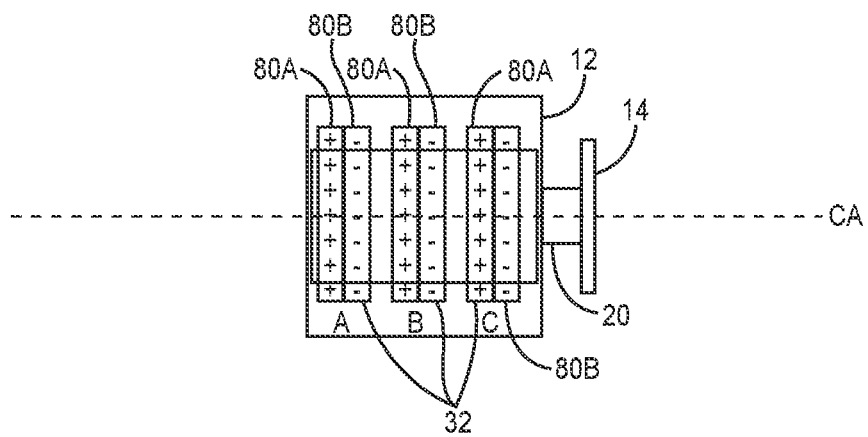
FIG. 7 is a schematic block diagram of a marine propulsion system.
Figure 8:
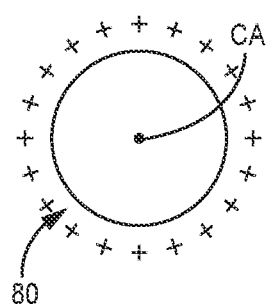
FIG. 8 is a schematic end view of a flux ring.

FIG. 7 is a schematic diagram of marine propulsion system 10. Apparatuses according to the present disclosure may have various advantages, as discussed herein. One advantage may be decreasing canting of propeller 14 relative to the axis of rotation AR of rotor 22, which can otherwise result in side-loading and premature failure. FIG. 7 shows a schematic diagram of motor 12 operably connected to propeller 14. FIG. 8 shows a simplified axial end of view a flux ring 80 showing polarization about axis CA. As discussed and shown previously, annular arrays of spurs 88 (not shown in FIG. 7) are polarized simultaneously by a coil 34 (not shown in FIG. 7), to the same polarity, entirely about the flux ring 80. This is represented by "+" symbols about the flux ring 80 in FIG. 8, however depending on the portion of the phase cycle, could be "−" instead.

FIG. 7 further shows the phases assemblies 32 of the motor 12. The phase assemblies 32 are labeled A, B, and C representing three phases, operated 120-degrees electrically offset. In this way, the phases are operated along the common axis CA. As shown, each phase assembly 32 includes a first flux ring 80A and a second flux ring 80B. The spurs of each flux paired set of first and second flux rings 80A, 80B are respectively oppositely polarized positive and negative, shown as "+" and "−". Each pole of a flux ring 80A, 80B is simultaneously polarized positive or negative 360-degrees around the common axis CA. The oppositely polarized orientation between the first and second flux rings 80A, 80B of each phase assembly 32 changes with the sinusoidal input signal to the respective coil of the phase assembly 32. Being that the first and second flux rings 80A, 80B are axially arrayed and oppositely charged, an axial force can be generated between them and the magnets of the rotor, except that such axial forces are balanced and canceled due to the two oppositely polarized first and second flux rings 80A, 80B. Each ring 80A, 80B is polarized completely around the common axis CA, balancing loads. It is possible that wear and tear over the course of time could degrade proper function of any motor, and such degradation could lead to an imbalance between the first and second flux rings 80A, 80B relative to the magnets (such as due to loss or defects in the materials, such as the coil), which due to the axially directed phases an imbalance would only urge the motor 12, and consequently the propeller 14, axially along the common axis. Such unintended force would not present a problem due to the propeller 14 being configured to generate an axial force. As such, motor 12 prevents undesired side loading on rotor shaft 26.

FIG. 9 is a schematic diagram of marine propulsion system 10'. The rotor 22 and the propeller 14 rotate coaxially with the common axis. Moreover, the rotor 22 and the propeller 14 rotate in a 1:1 relationship, each turning in fixed synchrony. As such, there is no gear reduction between the output of motor 12' and the propeller 14. In some cases, there can be no gear reduction despite the presence of bevel gears to change the direction of rotation. In some examples, marine propulsion system 10' can include a gear reduction that can be less than 1:2 or 1:3 or 1:5 or 1:10. The rotor 22 and the propeller 14 are rotationally fixed by hub 96. The hub 96 can be attached to each of the rotor 22 and the propeller 14. The hub 96 can be shaft, such as aluminum or steel shaft. In some examples, hub 96 can be formed by or connected to a drive shaft extending from rotor 22 (e.g., drive shaft 26). As previously discussed, a housing seal assembly (e.g., seal assembly 20) can be disposed between the rotating hub 96 (or other rotating component of rotor 22) and the motor body 44 to provide a water-tight seal at that interface. While an inner rotor embodiment of motor 12 is shown in this embodiment, the motor 12 could be an outer rotor in other examples. In such a case, the hub 96 and/or drive shaft 26 can directly connected to or be integral with the outer rotor of the motor (e.g., a body of the rotor that rotates about the stator).

The stator 24 of motor 12' includes six phase assemblies 32A-32F. The rotor 22 includes magnets and concentrators as previously shown that extend along the length of the rotor 22. A controller can cause the phase assemblies 32A-32F to act on the rotor 22 according to three phases, such that the current is provided 120-degrees electrically offset between the three phases. The six phase assemblies 32A-32F can be grouped in various ways according to the three phases. The three phases corresponding to the time in which a sinusoidal waveform peaks in a 360-degree framework. For example, phase assemblies 32A and 32D can be a first phase (e.g., 0 degrees), phase assemblies 32B and 32E can be a second phase (e.g., 120 degrees), and phase assemblies 32C and 32F can be a third phase (e.g., 120 degrees). As such, nonadjacent phase assemblies 32 can operate in the same phase, thus electromagnetically interacting in an identical manner in synchronous time with each other on the rotor 22. In another example, phase assemblies 32A and 32B can be a first phase (e.g., 0 degrees), phase assemblies 32C and 32D can be a second phase (e.g., 120 degrees), and phase assemblies 32E and 32F can be a third phase (e.g., 120 degrees). As such, adjacent phase assemblies 32 can operate in the same phase, thus electromagnetically interacting in an identical manner in synchronous time with each other on the rotor 22. It is understood that phase assemblies 32A-32F can be grouped in any desired manner. Any two of phase assemblies 32A-32F can form the first phase, any two of phase assemblies 32A-32F not forming the first phase can form the second phase, and any two of phase assemblies 32A-32F not forming the first and second phases can form the third phase. In some examples, a first subset of the phases is formed by adjacent ones of phase assemblies 32A-32F and a second subset of the phases is formed by non-adjacent ones of phase assemblies 32A-32F. In the example shown, one of the first and second subsets includes two of the phases and the other one of the first and second subsets includes the third one of the phases.

As discussed and shown previously, coils 34 can be disposed coaxially with common axis CA, which is the same axis about which both the rotor 22 and the propeller 14 rotate. Also, a spur array 84 can be closer to the propeller 14 than the nearest coil 34. A laminate portion of stator 24 can be closer to propeller 14 than any coil 34. For example, the closest end turn of coil 34 (if any end turn is present) is farther away from the propeller 14 than the closest spur array 84. This is different than what would be realized in traditional axial flux motors. The compact configuration and direct drive arrangement removes wear components, such as gearing, from the drive arrangement. Removal of such wear components reduces the need for servicing and decreasing complexity, thereby reducing cost and eliminating the need to track and manage various replacement parts.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A marine propulsion apparatus comprising:
   a motor housing;
   a propeller configured to be rotated on an axis and disposed outside of the motor housing;
   a drive shaft coaxial with the axis and connected to the propeller to drive rotation of the propeller coaxially with the axis, the drive shaft extending from within the motor housing to outside of the motor housing;
   a rotor configured to rotate coaxial with the axis, the drive shaft connected to the rotor to be rotated coaxial with the axis by the rotor;
   a stator disposed within the motor housing and configured to be electrically energized to generate magnetic flux that causes the rotor to rotate, the stator comprising at least one coil disposed within the motor housing; and
   a seal assembly extending around the drive shaft to form a seal with the drive shaft, the seal assembly separating a dry interior of the motor housing from a wet exterior of the motor housing, wherein the seal assembly is disposed axially between the propeller and the rotor;
   wherein the seal assembly is disposed axially closer to the propeller than any bearing of the marine propulsion apparatus.

2. The marine propulsion apparatus of claim 1, wherein the at least one coil extends fully annularly about the axis.

3. A marine propulsion apparatus, comprising:
   a motor housing;
   a propeller configured to be rotated on an axis and disposed outside of the motor housing;
   a drive shaft coaxial with the axis and connected to the propeller to drive rotation of the propeller coaxially with the axis, the drive shaft extending from within the motor housing to outside of the motor housing;
   a rotor configured to rotate coaxial with the axis, the drive shaft connected to the rotor to be rotated coaxial with the axis by the rotor;
   a stator disposed within the motor housing and configured to be electrically energized to generate magnetic flux that causes the rotor to rotate, the stator comprising at least one coil disposed within the motor housing; and
   a seal assembly extending around the drive shaft to form a seal with the drive shaft, the seal assembly separating a dry interior of the motor housing from a wet exterior of the motor housing, wherein the seal assembly is disposed axially between the propeller and the rotor;
   wherein the at least one coil extends fully annularly about the axis; and
   wherein the at least one coil includes a first coil, a second coil spaced axially from the first coil, and a third coil spaced axially from the first coil and the second coil.

4. The marine propulsion apparatus of claim 1, further comprising:
   a first bearing supporting the drive shaft, the first bearing disposed axially between the rotor and the propeller.

5. The marine propulsion apparatus of claim 4, wherein the first bearing is disposed directly axially between the rotor and the seal assembly.

6. The marine propulsion apparatus of claim 4, further comprising:
a second bearing supporting the drive shaft, wherein the rotor is disposed axially between the second bearing and the first bearing.

7. The marine propulsion apparatus of claim 6, wherein the motor housing comprises:
a housing body; and
an end cap connected to the housing body, wherein the second bearing is supported by the end cap.

8. The marine propulsion apparatus of claim 7, wherein the first bearing is supported by the housing body.

9. The marine propulsion apparatus of claim 7, wherein the end cap directly contacts the housing body such that a direct thermal path is formed between the end cap and the housing body.

10. A marine propulsion apparatus comprising:
a motor housing;
a propeller configured to be rotated on an axis and disposed outside of the motor housing;
a drive shaft coaxial with the axis and connected to the propeller to drive rotation of the propeller coaxially with the axis, the drive shaft extending from within the motor housing to outside of the motor housing;
a rotor configured to rotate coaxial with the axis, the drive shaft connected to the rotor to be rotated coaxial with the axis by the rotor;
a stator disposed within the motor housing and configured to be electrically energized to generate magnetic flux that causes the rotor to rotate, the stator comprising at least one coil disposed within the motor housing; and
a seal assembly extending around the drive shaft to form a seal with the drive shaft, the seal assembly separating a dry interior of the motor housing from a wet exterior of the motor housing, wherein the seal assembly is disposed axially between the propeller and the rotor;
a first bearing supporting the drive shaft, the first bearing disposed axially between the rotor and the propeller;
a second bearing supporting the drive shaft, wherein the rotor is disposed axially between the second bearing and the first bearing;
a support defining a plenum;
wherein the motor housing comprises:
a housing body; and
an end cap connected to the housing body, wherein the second bearing is supported by the end cap;
wherein the housing body is fixed to the support such that an inner axial portion of the housing body is disposed within the plenum and an outer axial portion of the housing body is disposed outside of the plenum such that the outer axial portion is exposed directly to an aquatic environment of the marine propulsion apparatus;
wherein the end cap is disposed within the plenum.

11. The marine propulsion apparatus of claim 7, wherein the drive shaft extends fully axially through the end cap.

12. A marine propulsion apparatus comprising:
a motor housing;
a propeller configured to be rotated on an axis and disposed outside of the motor housing;
a drive shaft coaxial with the axis and connected to the propeller to drive rotation of the propeller coaxially with the axis, the drive shaft extending from within the motor housing to outside of the motor housing;
a rotor configured to rotate coaxial with the axis, the drive shaft connected to the rotor to be rotated coaxial with the axis by the rotor;
a stator disposed within the motor housing and configured to be electrically energized to generate magnetic flux that causes the rotor to rotate, the stator comprising at least one coil disposed within the motor housing; and
a seal assembly extending around the drive shaft to form a seal with the drive shaft, the seal assembly separating a dry interior of the motor housing from a wet exterior of the motor housing, wherein the seal assembly is disposed axially between the propeller and the rotor;
wherein the drive shaft projects out of the motor housing in a first axial direction along the axis and the drive shaft projects out of the motor housing in a second axial direction along the axis, the second axial direction opposite the first axial direction.

13. A marine propulsion apparatus comprising:
a motor housing;
a propeller configured to be rotated on an axis and disposed outside of the motor housing;
a drive shaft coaxial with the axis and connected to the propeller to drive rotation of the propeller coaxially with the axis, the drive shaft extending from within the motor housing to outside of the motor housing;
a rotor configured to rotate coaxial with the axis, the drive shaft connected to the rotor to be rotated coaxial with the axis by the rotor;
a stator disposed within the motor housing and configured to be electrically energized to generate magnetic flux that causes the rotor to rotate, the stator comprising at least one coil disposed within the motor housing;
a seal assembly extending around the drive shaft to form a seal with the drive shaft, the seal assembly separating a dry interior of the motor housing from a wet exterior of the motor housing, wherein the seal assembly is disposed axially between the propeller and the rotor; and
a support defining a plenum;
wherein the motor housing is fixed to the support such that a first end of the motor housing is disposed within the plenum and a second end of the motor housing extends out of the plenum.

14. The marine propulsion apparatus of claim 13, wherein an outer axial portion of the motor housing is disposed outside of the plenum such that the outer axial portion is exposed directly to an aquatic environment of the marine propulsion apparatus.

15. The marine propulsion apparatus of claim 1, wherein the seal assembly is disposed axially closer to the propeller than any coil of the stator.

16. The marine propulsion apparatus of claim 1, wherein the seal assembly is disposed axially closer to the propeller than any portion of the stator formed from metal laminate.

17. A marine propulsion apparatus comprising:
a motor housing comprising:
a housing body; and
an end cap connected to the housing body;
a propeller configured to be rotated on an axis and disposed outside of the motor housing;
a drive shaft coaxial with the axis and connected to the propeller to drive rotation of the propeller coaxially with the axis, the drive shaft extending from within the motor housing to outside of the motor housing, wherein the drive shaft extends fully axially through the end cap;
a rotor configured to rotate coaxial with the axis, the drive shaft connected to the rotor to be rotated coaxial with the axis by the rotor;

a stator disposed within the motor housing and configured to be electrically energized to generate magnetic flux that causes the rotor to rotate, the stator comprising at least one coil disposed within the motor housing;

a seal assembly extending around the drive shaft to form a seal with the drive shaft, the seal assembly separating a dry interior of the motor housing from a wet exterior of the motor housing, wherein the seal assembly is disposed axially between the propeller and the rotor;

a first bearing supporting the drive shaft, the first bearing disposed axially between the rotor and the propeller, wherein the seal assembly is disposed axially between the first bearing and the propeller; and a second bearing supporting the drive shaft, wherein the rotor is disposed axially between the second bearing and the seal assembly, and wherein the second bearing is supported by the end cap.

18. A marine propulsion apparatus comprising:

a motor housing;

a propeller configured to be rotated on an axis and disposed outside of the motor housing;

a drive shaft coaxial with the axis and connected to the propeller to drive rotation of the propeller coaxially with the axis, the drive shaft extending from within the motor housing to outside of the motor housing;

a rotor configured to rotate coaxial with the axis, the drive shaft connected to the rotor to be rotated coaxial with the axis by the rotor;

a stator disposed within the motor housing and configured to be electrically energized to generate magnetic flux that causes the rotor to rotate, the stator comprising at least one coil disposed within the motor housing;

a seal assembly extending around the drive shaft to form a seal with the drive shaft, the seal assembly separating a dry interior of the motor housing from a wet exterior of the motor housing, wherein the seal assembly is disposed axially between the propeller and the rotor;

a first bearing supporting the drive shaft, the first bearing disposed axially between the rotor and the propeller, wherein the seal assembly is disposed axially between the first bearing and the propeller;

a second bearing supporting the drive shaft, wherein the rotor is disposed axially between the second bearing and the seal assembly; and a support defining a plenum;

wherein the motor housing is fixed to the support such that a first end of the motor housing is disposed within the plenum and a second end of the motor housing extends out of the plenum.

19. The marine propulsion apparatus of claim 18, wherein the motor housing comprises:

a housing body supporting the first bearing, the housing body extending out of the plenum; and an end cap connected to the housing body, the end cap supporting the second bearing, and the end cap disposed within the plenum.

\* \* \* \* \*